(12) United States Patent
Allen et al.

(10) Patent No.: US 8,250,637 B2
(45) Date of Patent: Aug. 21, 2012

(54) DETERMINING THE DEGREE OF RELEVANCE OF DUPLICATE ALERTS IN AN ENTITY RESOLUTION SYSTEM

(75) Inventors: Thomas B. Allen, Henderson, NV (US); Barry M. Caceres, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 952 days.

(21) Appl. No.: 12/111,626

(22) Filed: Apr. 29, 2008

(65) Prior Publication Data
US 2009/0271862 A1  Oct. 29, 2009

(51) Int. Cl.
*G06F 21/00* (2006.01)
(52) U.S. Cl. ............... 726/6; 705/38; 705/318; 705/325
(58) Field of Classification Search .................... 726/6
See application file for complete search history.

(56) References Cited

U.S. PATENT DOCUMENTS

| | | | |
|---|---|---|---|
| 5,274,547 A * | 12/1993 | Zoffel et al. .................... | 705/38 |
| 6,292,795 B1 | 9/2001 | Peters et al. | |
| 6,424,968 B1 | 7/2002 | Broster et al. | |
| 6,460,025 B1 | 10/2002 | Fohn et al. | |
| 6,704,874 B1 | 3/2004 | Porras et al. | |
| 6,816,850 B2 | 11/2004 | Culliss | |
| 7,254,570 B2 | 8/2007 | Stickler | |
| 7,458,508 B1 * | 12/2008 | Shao et al. .................... | 235/380 |
| 7,542,969 B1 | 6/2009 | Rappaport et al. | |
| 2003/0023722 A1 | 1/2003 | Vinberg | |
| 2003/0093514 A1 | 5/2003 | Valdes et al. | |
| 2003/0177118 A1 * | 9/2003 | Moon et al. ........................ | 707/5 |
| 2004/0006748 A1 | 1/2004 | Srivastava et al. | |
| 2004/0177053 A1 | 9/2004 | Donoho et al. | |
| 2005/0055345 A1 * | 3/2005 | Ripley ............................... | 707/3 |
| 2005/0076060 A1 | 4/2005 | Finn et al. | |
| 2005/0171946 A1 | 8/2005 | Maim | |

(Continued)

FOREIGN PATENT DOCUMENTS
EP   1122694 A2   8/2001
(Continued)

OTHER PUBLICATIONS

Singhal et al., Data Mining for Intrusion Detection, Sep. 2005, Springer US, Data Mining and Knowledge Discovery Handbook, pp. 1225-1237.*

(Continued)

*Primary Examiner* — Taghi Arani
*Assistant Examiner* — Kenneth Chang
(74) *Attorney, Agent, or Firm* — Patterson & Sheridan, LLP

(57) ABSTRACT

An entity resolution system and alert analysis system configured to process inbound identity records and to generate alerts based on relevant identities, entities, conditions, activities, or events is disclosed. One process of resolving identity records and detecting relationships between entities may be performed using a pre-determined or configurable entity resolution rules. Further, the entity resolution system may include an alert analysis system configured to allow analysts to review and analyze alerts, entities, and identities, as well as provide comments or assign a disposition to alerts generated by the entity resolution system. Furthermore, the entity resolution system may be configured to handle duplicate alerts, i.e., one or more identical or near-identical alerts generated using the same entities and/or identities as well as assign a relevance score to the particular entities and identities included in the alert.

21 Claims, 15 Drawing Sheets

U.S. PATENT DOCUMENTS

| | | | |
|---|---|---|---|
| 2005/0198099 A1 | 9/2005 | Motsinger et al. | |
| 2005/0216953 A1* | 9/2005 | Ellingson | 726/6 |
| 2005/0283753 A1 | 12/2005 | Ho et al. | |
| 2006/0031203 A1 | 2/2006 | Rosenbaum et al. | |
| 2006/0036599 A1 | 2/2006 | Glaser et al. | |
| 2006/0122978 A1 | 6/2006 | Brill et al. | |
| 2006/0149674 A1* | 7/2006 | Cook et al. | 705/44 |
| 2006/0202012 A1* | 9/2006 | Grano et al. | 235/379 |
| 2006/0285665 A1* | 12/2006 | Wasserblat et al. | 379/114.14 |
| 2007/0005892 A1 | 1/2007 | Mullender et al. | |
| 2007/0078973 A1 | 4/2007 | Kussmaul et al. | |
| 2007/0106659 A1 | 5/2007 | Lu et al. | |
| 2007/0112607 A1 | 5/2007 | Tien et al. | |
| 2007/0136343 A1 | 6/2007 | Wang et al. | |
| 2007/0168448 A1 | 7/2007 | Garbow et al. | |
| 2007/0174448 A1* | 7/2007 | Ahuja et al. | 709/224 |
| 2007/0179945 A1 | 8/2007 | Marston et al. | |
| 2007/0179949 A1 | 8/2007 | Sun et al. | |
| 2007/0220043 A1 | 9/2007 | Oliver et al. | |
| 2007/0233559 A1 | 10/2007 | Golec | |
| 2007/0250621 A1 | 10/2007 | Hillier | |
| 2008/0005076 A1 | 1/2008 | Payne et al. | |
| 2008/0103800 A1 | 5/2008 | Domenikos et al. | |
| 2008/0162514 A1 | 7/2008 | Franks et al. | |
| 2008/0243607 A1 | 10/2008 | Rohan et al. | |
| 2008/0281812 A1 | 11/2008 | Sotos | |
| 2008/0306908 A1 | 12/2008 | Agrawal et al. | |
| 2008/0319731 A1 | 12/2008 | Chambliss et al. | |
| 2009/0083262 A1 | 3/2009 | Chang et al. | |
| 2009/0228579 A1 | 9/2009 | Sanghvi | |
| 2009/0234827 A1* | 9/2009 | Gercenstein et al. | 707/5 |

FOREIGN PATENT DOCUMENTS

| | | |
|---|---|---|
| JP | 2006171807 A | 6/2006 |

OTHER PUBLICATIONS

Phua et al., Temporal Representation in Spike Detection of Sparse Personal Identity Streams, Apr. 2006, Springer Berlin, Intelligence and Security Informatics WISI 2006, pp. 115-126.*

Zong, Mao-Sheng, et al. "A New Method of Relevance Measure and its Applications," 18th International Workshop on Database and Expert Systems Applications, (2007) IEEE Computer Society, pp. 595-600.

IBM Entity Analytic Solutions V4.1.0 Delivers Powerful, Anonymous Identity Recognition and Relationship Awareness, IBM Software Announcement, May 23, 2006, 206/117, pp. 1-6.

Wu, Shengli, et al. "Regression Relevance Models for Data Fusion," 18th International Workshop on Database and Expert Systems Applications, (2007) IEEE Computer Society, pp. 264-268.

Notice of Allowance for U.S. Appl. No. 12/111,753 dated Mar. 1, 2011.

Balahur et al., "A feature dependent method for opinion mining and classification," NLP-Ke '08 International Conference on Natural Language Processing and Engineering, Oct. 2008: pp. 1-7.

Dzunic et al., "Coreference Resolution using Decision Trees," 8th Seminar on Neural Network Applications in Electrical Engineering, Sep. 2006: pp. 109-114.

He et al., "A Neural Networks-Based Graph Algorithm for Cross-Document Coreference Resolution," NLP-KE '08 International Conference on Natural Language Processing and Engineering, Oct. 2008: pp. 1-9.

Huang et al., "Coreference resolution in biomedical full-text articles with domain dependent features," 2010 2nd International Conference on Computer Technology and Development (ICCT), Nov. 2010: pp. 616-620.

Notice of Allowance of U.S. Appl. No. 12/111,753 dated May 5, 2011.

U.S. Patent Application entitled "Determining the Degree of Relevance of Entities and Identities in an Entity Resolution System That Maintains Alert Relevance," by Thomas B. Allen, et al., Apr. 29, 2008.

U.S. Patent Application entitled "Determining the Degree of Relevance of Alerts in an Entity Resolution System Over Alert Disposition Lifecycle," by Thomas B. Allen, et al., Apr. 29, 2008.

U.S. Patent Application entitled "Determining the Degree of Relevance of Alerts in an Entity Resolution System," by Thomas B. Allen, et al., Apr. 29, 2008.

Wang, JR and Masnick, SE, "The Inter-database Instance Identification Problem in Integrating Autonomous Systems", Fifth International Conference on Data Engineering Proceedings, 1989 pp. 46-55.

* cited by examiner

Role Alert Rule Configuration

- Rule Name: Vendor knows/is Employee — 205
- Role 1: Employee
- Role 2: Vendor  } — 210
- Min Relation Strength: 90   *(0 to 100)* — 215
- Relevance Score: 85   *(0 to 100)* — 220

[ Save ] [ Revert ]

Role Alert Rule Configuration

- Rule Name: Vendor knows/is Employee — 255
- Role 1: Employee
- Role 2: Vendor  } — 260
- Min Relation Strength: 90   *(0 to 100)* — 265
- Relevance Score: Major — 270

[ Save ] [ Revert ]

*Alert Inbox*

Filter: | Relevance | > | 10 | [remove filter]
| Timestamp | > | Last 3 Days | [remove filter] [add filter]

| Alert ID | Alert Rule | Disposition | Relevance | Timestamp |
|---|---|---|---|---|
| 9824421 | Customer is on High-Income List (Survey) | Investing (Opportunity) | 91.0 | 20-Jul-2007 @ 08:34:12 PDT |
| 9824405 | Customer is on High-Income List (Survey) | Investing (Opportunity) | 91.0 | 20-Jul-2007 @ 08:17:55 PDT |
| 9824532 | Employer knows/is Criminal | New | 87.8 | 21-Jul-2007 @ 14:34:56 PDT |
| 9824398 | Vendor knows/is Criminal | Investing (Threat) | 84.8 | 20-Jul-2007 @ 08:11:33 PDT |
| 9824566 | Employee known/is Vendor | New | 75.8 | 21-Jul-2007 @ 14:34:23 PDT |
| 9824487 | Employee known/is Vendor | New | 72.1 | 20-Jul-2007 @ 11:23:22 PDT |
| 9824441 | Employee knows/is Repeat-Refund Customer | Investing (Threat) | 45.3 | 20-Jul-2007 @ 09:56:11 PDT |
| 9824321 | Employee knows/is Repeat-Refund Customer | Close (Benign) | 11.8 | 19-Jul-2007 @ 17:45:41 PDT |

FIG. 5

Alert Relevance Rule Configuration

Rule Name: Insider Injury Fraud at Store #334 — 605
Multiply Relevance Score By: 1.5 — 610

600

Field | Matching Value
Alert Rule | Employee knows/is Personal Injury Plaintiff
Attribute (Store Number) | 344

*Add Qualifying Criteria*
— 620

615

[ Save ] [ Revert ]

FIG. 6

Alert Detail

Alert Rule Name: Employee knows/is Vendor
Created: 21-Jul-2007 @ 14:34:23 PDT
Modified: 19-Aug-2007 @ 16:11:43 PDT
Entities: 00034665 (Joe Schmoe)
02344031 (Jane Doe)
Relevance Score: 97.5
Disposition: Threat
Degrees of Separation: 3
Relationship Strength: 88.3

History

| Timestamp | Relevance | Disposition | User | Comment |
|---|---|---|---|---|
| 21-Jul-2007 @ 14:34:23 PDT | 75.8 | New | [System] | Alert created |
| 21-Jul-2007 @ 14:34:56 PDT | 87.8 | New | [System] | Alert score refined by rule: Fraud at Store #512 |
| 23-Jul-2007 @ 09:32:11 PDT | 15.3 | Benign | jsmith | Relationship is strong, but there does not appear to be a possibility of fraud. |
| 19-Aug-2007 @ 16:11:43 PDT | 97.5 | Threat | jsmith | Employee was promoted and now has decision making power with regard to the relationship with this vendor. |

[ Visualize Relationship ]  [ Change Disposition ]  [ Close Window ]

FIG. 9A

Disposition Configuration

Disposition Name: Benign
Description: The alert does not seem to pose any threat or provide any real oppertunity.
Modify Relevance Score: Yes

| Transformation Operator | Value | Order |
|---|---|---|
| Multiply Relevance Score By | 0.2 | ∨∧ |
| Reduce Relevance Score By | 10 | ∨∧ |
| Bound Minimum Relevance Score To | 0 | ∨∧ |

Add Relevance Score Transformation

[ Save ]  [ Revert ]

FIG. 9B

System Settings: Duplicate Alerts

Alerts Are Duplicates When: 1205
- ○ They were created by the same alert rule for the same entities.
- ○ They were created by the same alert rule for the same identities (i.e.: the entity composition has not changed).
- ⦿ They were created by the same alert rule for the same entities without a change in the relationship strength.

Handle Duplicates By: 1210
- ○ Treating them as any other alert (do nothing).
- ⦿ Weighting their relevance with the relevance of the previous duplicate.
- ○ Suppressing the duplicate alert.

System Settings: Duplicate Alerts

Alerts Are Duplicates When: 1220
- ○ They were created by the same alert rule for the same entities.
- ○ They were created by the same alert rule for the same identities (i.e.: the entity composition has not changed).
- ⦿ They were created by the same alert rule for the same entities without a change in the relationship strength. — 1225

Relevance Weight of Prev. Duplicates: [50] (0 to 100, use 0 for no weight)

Role Alert Rule Configuration

Rule Name: [Vendor knows/is Employee] — 1235
Role 1: [Employee ▼]
Role 2: [Vendor ▼] } 1240
Min Relation Strength: [90] (0 to 100) — 1245
Relevance Score: [85] (0 to 100) — 1250
Relevance Weight of Prev. Duplicates: [50] (0 to 100, use 0 for no weight)
1255

[Save] [Revert]

*Entity Detail*

Best Name: Joe Schmoe
Best Address: 101 Main Street
　　　　　　　Las Vegas, NV 89119
Best Phone: (702) 555-1212
Best Identifier: 111-11-1111 (SSN)
　　Created: 21-Jul-2005 @ 14:34:23 PDT
　　Modified: 19-Aug-2007 @ 16:11:43 PDT
Relevance Score: 97.5

▸ *Known Names (3)*

▸ *Known Addresses (8)*

▸ *Known Phone Numbers (5)*

▸ *Known Identifiers (15)*

▾ *Source Identies (5)*

Filter: [Relevance ▾] [Greater-Than ▾] [50] [remove filter] [add filter]

| Data Source ⇵ | External ID ⇵ | Role ⇵ | Relevance ⇵ | Initial Load ⇵ | Last Modified ⇵ |
|---|---|---|---|---|---|
| Employee Database | 111-11-1111 | Employee | 143.5 | 20-Dec-2006 @ 11:21:18 PDT | 21-Jul-2007 @ 14:34:23 PDT |
| FBI Wanted List | A-000112 | Criminal | 121.2 | 21-Jul-2007 @ 12:09:19 PDT | 21-Jul-2007 @ 12:09:19 PDT |
| Vendor Database | V1100-AA-22111 | Vendor | 90.2 | 05-Jan-2007 @ 09:11:16 PDT | 05-Jan-2007 @ 09:11:16 PDT |
| Customer Database | 00009-11112 | Customer | 50.2 | 20-Jan-2007 @ 11:23:10 PDT | 16-May-2007 @ 18:08:22 PDT |

[Visualize Entity] [Close Window]

FIG. 14B

DETERMINING THE DEGREE OF RELEVANCE OF DUPLICATE ALERTS IN AN ENTITY RESOLUTION SYSTEM

BACKGROUND OF THE INVENTION

1. Field of the Invention

Embodiments of the invention generally relate to managing alerts in an entity resolution system, and more particularly, to a variety of techniques for assigning and managing a degree of relevance to alerts generated by an entity resolution system.

2. Description of the Related Art

In an entity resolution system, identity records are loaded and resolved against known identities to derive a network of entities and relationships between entities. An "entity" generally refers to an organizational unit used to store identity records that are resolved at a "zero-degree relationship." That is, each identity record associated with a given entity is believed to describe the same person, place, or thing. Thus, one entity may reference multiple individual identities. This is frequently benign, e.g., in a case where an entity includes two identities, a first with identity records identifying a woman based on a familial surname and a second identity with records identifying the same woman based on a married surname. Of course, in other cases, multiple identities may be an indication of mischief or a problem, e.g., in a case where one individual is impersonating another, using a fictitious identify, or engaging in some form of identify theft. The entity resolution system may link entities to one another by relationships. For example, a first entity may have a $1^{st}$ degree with a second entity based on identity records (in one entity, the other, or both) that indicate the individuals represented by these two entities are married to one another, reside at the same address, or share some other common information.

One task performed by an entity resolution system is to generate alerts when the existence of a particular identity record (typically the inbound record being processed) causes some condition to be satisfied that is relevant in some way and that may require additional scrutiny by an analyst. The result of these processes is typically a list of alerts about identities or entities that should be examined by an analyst. Relevance detection may be used to help identify potential threats and fraud as well as potential opportunity.

Additionally, entity resolution systems typically include (or are compatible with) an entity resolution alert analysis system that allow analysts to review and analyze alerts, entities, and identities, as well as provide comments or assign a disposition to alerts. In such systems, an assigned disposition often takes the form of a tagged value that provides an alert lifecycle (e.g., "NEW", "OPEN", "CLOSED", "INVESTIGATING", etc.).

SUMMARY OF THE INVENTION

One embodiment of the invention includes a computer-implemented method for processing identity records received by an entity resolution system. The method may generally include receiving a first identity record, associating the identity record with a first entity, and evaluating at least the first entity against one or more conditions specified in a relevance detection rule. Upon determining that the one or more conditions specified by the relevance detection rule are satisfied, a first alert is generated and an original alert relevance score is assigned to the first alert. The alert relevance score may be determined, at least in part, on a rule relevance score associated with the relevance detection rule. Additionally, upon determining that the first alert is a duplicate of a second, previously generated, alert, at least an alert relevance score associated with the second alert is retrieved and a current alert relevance score is assigned to the first alert. The current relevance score may be determined, at least in part, on the alert relevance score associated with the second alert and the original alert relevance score assigned to the first alert. Also, each of the alert relevance scores provides a quantitative measure of relevance for an occurrence of an event that satisfies the one or more conditions of the relevance detection rule.

Another embodiment of the invention includes a computer-readable storage medium containing a program, which, when executed by the computer performs an operation for processing identity records received by an entity resolution system. The operation may generally include receiving a first identity record, associating the first identity record with a first entity, and evaluating at least the first entity against one or more conditions specified in a relevance detection rule. Upon determining that the one or more conditions specified by the relevance detection rule are satisfied, a first alert is generated and an original alert relevance score is assigned to the first alert. The alert relevance score may be determined, at least in part, on a rule relevance score associated with the relevance detection rule. Additionally, upon determining that the first alert is a duplicate of a second, previously generated, alert, at least an alert relevance score associated with the second alert is retrieved and a current alert relevance score is assigned to the first alert. The current relevance score may be determined, at least in part, on the alert relevance score associated with the second alert and the original alert relevance score assigned to the first alert. Also, each of the alert relevance scores provides a quantitative measure of relevance for an occurrence of an event that satisfies the one or more conditions of the relevance detection rule.

Still another embodiment of the invention includes a system having a processor and a memory containing a program, which, when executed by the processor is configured to process identity records received by an entity resolution system by performing a method. The method may generally include receiving a first identity record, associating the identity record with a first entity, and evaluating at least the first entity against one or more conditions specified in a relevance detection rule. Upon determining that the one or more conditions specified by the relevance detection rule are satisfied, a first alert is generated and an original alert relevance score is assigned to the first alert. The alert relevance score may be determined, at least in part, on a rule relevance score associated with the relevance detection rule. Additionally, upon determining that the first alert is a duplicate of a second, previously generated, alert, at least an alert relevance score associated with the second alert is retrieved and a current alert relevance score is assigned to the first alert. The current relevance score may be determined, at least in part, on the alert relevance score associated with the second alert and the original alert relevance score assigned to the first alert. Also, each of the alert relevance scores provides a quantitative measure of relevance for an occurrence of an event that satisfies the one or more conditions of the relevance detection rule.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 2A-2B illustrate examples of graphical user interface components used to define a relevance detection rule in an entity resolution system, according to one embodiment of the invention.

FIG. 5 illustrates an example of graphical user interface component displaying a list of alerts generated by an entity resolution system, sorted by alert relevance, according to one embodiment of the invention.

FIG. 6 illustrates an example of graphical user interface components used to configure an alert relevance rule in an entity resolution system, according to one embodiment of the invention.

FIGS. 9A-9B illustrate an example of graphical user interface components configured to display changes to an alert relevance score for a given alert based on changes in lifecycle disposition, according to one embodiment of the invention.

FIGS. 12A-12C illustrate example graphical user interface components used to configure a duplicate alert detection and resolution policy in an entity resolution system, according to one embodiment of the invention.

FIGS. 14A-14B illustrate example graphical user interface components configured to display entity and identity relevance scores, according to one embodiment of the invention.

DETAILED DESCRIPTION OF THE PREFERRED EMBODIMENTS

Figure 1:
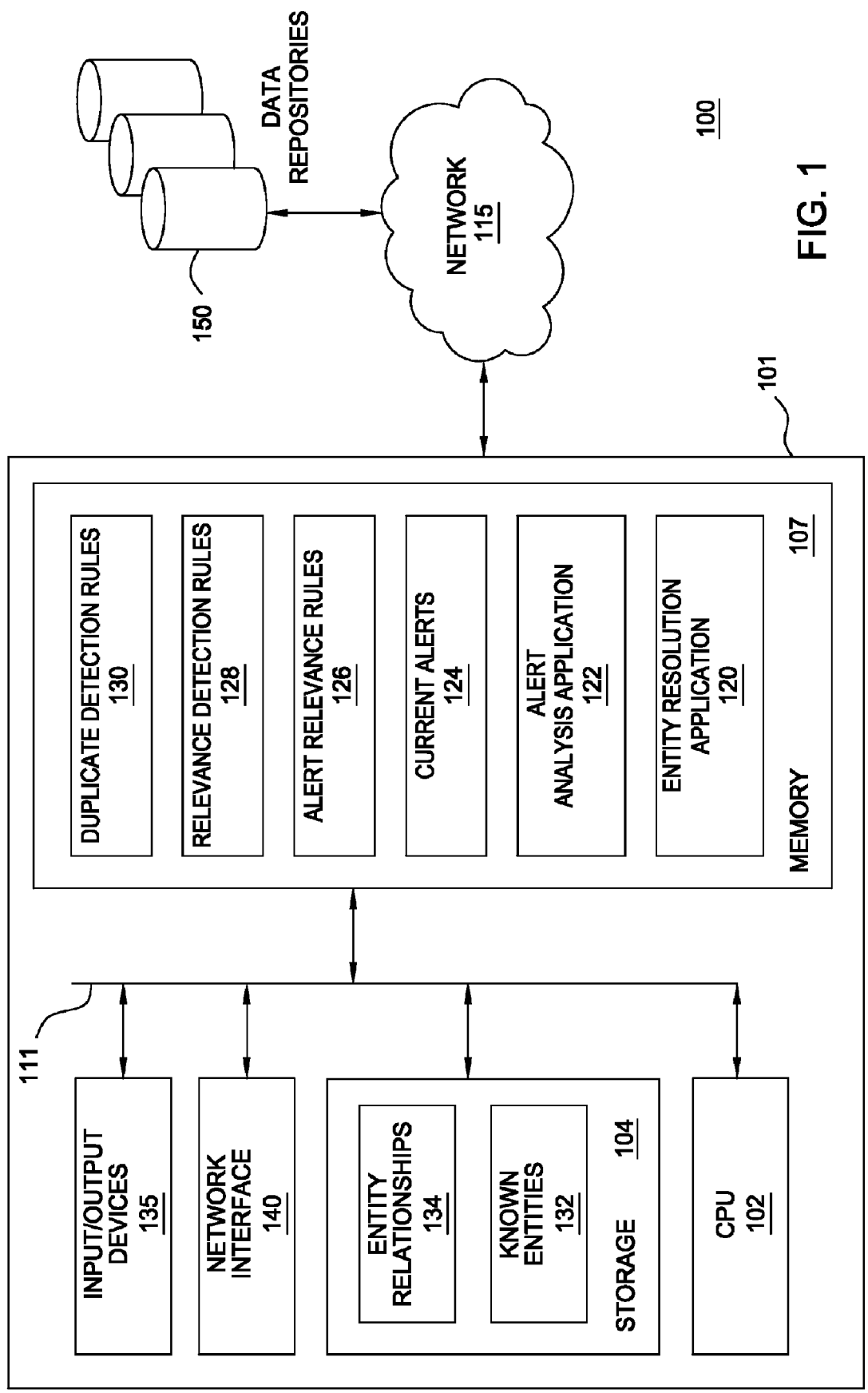
FIG. 1 is a block diagram illustrating a computing environment that includes an entity resolution application and an alert analysis application, according to one embodiment of the invention.

Embodiments of the invention provide an entity resolution system and alert analysis system configured to process inbound identity records and to generate alerts based on relevant identities, entities, conditions, activities, or events. The process of resolving identity records and detecting relationships between entities may be performed using a pre-determined or configurable entity resolution rules. Typically, relationships between two entities are derived from information (e.g., a shared address, employer, telephone number, etc.) in identity records that indicate a relationship between the two entities Two examples of such rules include the following:

If the inbound identity record has a matching "Social Security Number" and close "Full Name" to an existing entity, then resolve the new identity to the existing entity.

If the inbound identity record has a matching "Phone Number" to an existing entity, then create a relationship between the entity of the inbound identity record and the one with the matching phone number.

The first rule adds a new inbound record to an existing entity, where the second creates a relationship between two entities based on the inbound record. Of course, the entity resolution rules may be tailored based on the type of inbound identity records and to suit the needs of a particular case.

In one embodiment, the entity resolution system may also include rules for detecting relevant identities, entities, conditions, or events, i.e., rules for generating alerts based on incoming identity records. For example, a rule may check the attributes of an inbound identity record and generate an alert when a particular match is found (e.g., the inbound identity record is of interest because it includes an address within a particular zip-code). Or an alert rule may specify situations where an assigned role of an inbound identity record conflicts with an assigned role of another identity record with which the inbound record has a relationship at zero or more degrees (e.g., an entity with an assigned role of "Employee" has a strong relationship to an entity with an assigned role of "Vendor"). As another example, an alert rule may be defined as a combination of both methods (e.g., alert whenever an entity with the "Nevada Gaming Black List" role also has the "Hotel Guest" role and the hotel involved is located in the state of "Nevada"). Of course, the relevance rules used may be tailored to suit the needs of a particular case.

Further, the entity resolution system may include an alert analysis system configured to allow analysts to review and analyze alerts, entities, and identities, as well as provide comments or assign a disposition to alerts generated by the entity resolution system. In such systems, an assigned disposition may take the form of a tagged value indicating a state of an alert within an alert lifecycle (e.g., "NEW", "OPEN", "CLOSED", "INVESTIGATING" etc.) or some arbitrary user-defined meaning (e.g., "THREAT," "OPPORTUNITY," or "BENIGN"). The entity resolution system may also be configured to rank the relevance of each alert based the particular relevance detection rules that generated the alert. Doing so allows users of the entity resolution systems to organize their work according to the relevance of alerts and to update the relevance of alerts through the normal process of assigning a disposition to an alert.

Furthermore, the alert analysis system may be configured to handle duplicate alerts, i.e., one or more identical or near-identical alerts generated using the same entities and/or identities. Additionally, in one embodiment, the alert analysis system may also determine and assign a relevance score to the particular entities and identities included in the alert. This information may be used to modify the current alert relevance score based on the entities or identities involved in the alert.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

An Entity Resolution System with Relevance Detection Rules

FIG. 1 is a block diagram illustrating a computing environment 100 that includes an entity resolution application 120 and an alert analysis application 122, according to one embodiment of the invention. FIG. 1 shows a computer system 101 which is included to be representative of existing computer systems, e.g., desktop computers, server computers, laptop computers, tablet computers, and the like. However, the computer system 101 illustrated in FIG. 1 is merely an example of a computing system. Embodiments of the present invention may be implemented using other computing systems, regardless of whether the computer systems are complex multi-user computing systems, such as a cluster of individual computers connected by a high-speed network, single-user workstations, or network appliances lacking non-volatile storage. Further, the software applications described herein may be implemented using computer software applications executing on existing computer systems. However, the software applications described herein are not limited to any currently existing computing environment or programming language, and may be adapted to take advantage of new computing systems as they become available.

As shown, computer system 101 includes a central processing unit (CPU) 102, which obtains instructions and data via a bus 111 from memory 107 and storage 104. CPU 102 represents one or more programmable logic devices that perform all the instruction, logic, and mathematical processing in a computer. For example, CPU 102 may represent a single CPU, multiple CPUs, a single CPU having multiple processing cores, and the like. Storage 104 stores application programs and data for use by computer system 101. Storage 104 may be hard-disk drives, flash memory devices, optical media and the like. Computer system 101 may be connected to a data communications network 115 (e.g., a local area network, which itself may be connected to other networks such as the internet). As shown, storage 103 includes a collection of known entities 132 and entity relationships 134. In one embodiment, each known entity 132 stores one or more identity records that are resolved at a "zero-degree relationship." That is, each identity record in a given known entity 132 is believed to describe the same person, place, or thing represented by that known entity 132.

Additionally, computer system 101 includes input/output devices 135 such as a mouse, keyboard and monitor, as well as a network interface 140 used to connect computer system 101 to network 115.

Entity relationships 134 represent identified connections between two (or more) entities. In one embodiment, relationships between entities may be derived from identity records associated with a first and second entity, e.g., records for the first and second entity sharing and address or phone number. Relationships between entities may also be inferred based on identity records in the first and second entity, e.g., records indicating a role of "employee" for a first entity and a role of "vendor" for a second entity. Relationships may also be based on express statements of relationship, e.g., where an identity record associated with the first entity directly states a relationship to the second e.g., an identity record listing the name of a spouse, parent, child, or other family relation, as well as other relationships such as the name of a friend or work supervisor.

Memory 107 can be one or a combination of memory devices, including random access memory, nonvolatile or backup memory, (e.g., programmable or flash memories, read-only memories, etc.). As shown, memory 107 includes the entity resolution application 120 and the alert analysis application 122. Memory 107 also includes a set of current alerts 124, a set of alert relevance rules 126, a set of relevance rules 128, and a set of duplicate detection rules 130. Each set of rules is discussed in greater detail below.

In one embodiment, the entity resolution application 120 provides a software application configured to resolve inbound identity records received from the data repositories against the known entities 132. When an inbound record is determined to reference one (or more) of the known entities 132, the record is then associated with that entity 132. Additionally, the entity resolution application 120 may be configured to create relationships 134 (or strengthen or weaken existing relationships) between known entities 132, based on an inbound identity record. For example, the entity resolution application 120 may merge two entities where a new inbound entity record includes the same social security number as one of the known entities 132, but with a name and address of another known entity 132.

Illustratively, computing environment 100 also includes a set of data repositories 150. In one embodiment, the data repositories 150 each provide a source of inbound identity records processed by the entity resolution application 120 and the alert analysis application 122. Examples of data repositories 150 include information from public sources (e.g., telephone directories and/or county assessor records, among others.) And also includes information from private sources, e.g., a list of employees and their roles within an organization, information provided by individuals directly such as forms filled out online or on paper, and records created concomitant with an individual engaging in some transaction (e.g., hotel check-in records or payment card use). Additionally, data repositories 150 may include information purchased from vendors selling data records. Of course, the actual data repositories 150 used by the entity resolution application 120 and the alert analysis application 122 may be tailored to suit the needs of a particular case, and may include any combination of the above data sources listed above, as well as other data sources. Further, information from data repositories 150 may be provided in a "push" manner where identity records are actively sent to the entity resolution application 120 and the alert analysis application 122 as well as in a "pull" manner where the entity resolution application 120 and the alert analysis application 122 actively retrieve and/or search for records from data repositories 150.

In one embodiment, the entity resolution application 120 may be configured to detect relevant identities, entities, conditions, or activities which should be the subject of further analysis. For example, once an inbound identity record is resolved against a given entity, relevance detection rules 128 may be evaluated to determine whether the entity, with the new identity record, satisfies conditions specified by any one of the relevance detection rules. That is, the entity resolution application 120 may determine whether the entity, with the new identity record, indicates that a relevant event has occurred. This could be manifested as a rule that checks the content of an inbound identity record and generates alerts if a particular match is found.

Further, in one embodiment, each relevance detection rule 128 may include a rule relevance score which provides a quantitative value designating the relevance of an event that fulfills the conditions of the rule 128. That is, some rules may describe an event or condition that is more (or less) relevant than others. Thus, new alerts may be sorted, categorized, and evaluated based on the relevance detection rule 128 that triggered a given alert. For example, detecting a first customer from a particular zip code is likely to be less relevant then detecting when an insider fraud scenario may be underway. The actual score may be implemented in a variety of ways. For example, the rule relevance score may specify a number from 0 to 100 where the greater the magnitude of the number indicates the greater level of importance or relevance. Or the rule relevance score could specify a number from 1 to 10 where the least number designates the highest rank and therefore the greatest level of importance. Alternatively, the rule relevance score could be defined using a set of fixed tags with an implicit ordering such as "LOW", "MEDIUM", and "HIGH." In such a case, the tag could be converted to a numerical representation for the purpose of performing calculations using the tags.

Furthermore, in one embodiment, when an inbound identity record triggers an alert, the alert may also be assigned an alert relevance score according to alert relevance rules 126. For example, alert relevance rules 126 may be used to evaluate a given alert (along with the rule relevance score assigned to the rule that triggered the alert) to determine an alert relevance score for that alert. Thus, the entity resolution application 120 may provide sorting and filtering of alerts by relevance of each individual alert generated using the same relevance detection rule. The alert relevance score assigned to a given alert may provide a quantitative measure regarding the relevance of the alert at given points in time. For example, the relevance of an alert may change during the alert lifecycle where an analyst transitions an alert state from "new" to "open" to "investigating" to "resolved" using the alert analysis application 122. Accordingly, in one embodiment, the alert relevance score may be updated from an "original alert relevance score" (determined from the rule relevance score that triggered the alert) to a "current alert relevance score" based on the current lifecycle disposition of the alert, and on other factors discussed below.

FIGS. 2A-2B illustrates examples of graphical user interface components used to define a relevance detection rule in an entity resolution system, according to one embodiment of the invention. As shown in FIG. 2A, a dialog box 200 allows a user to configure a relevance detection rule for a "role conflict," i.e., a rule used to detect situations where a vendor and an employee share a strong personal relationship, creating potential for a conflict-of-interest. Of course, the components of dialog box 200 (or other interface element) used to define a relevance detection rule may be tailored for the elements of a particular rule. In this example, dialog box 200 includes a text-box 205 used to enter a rule name and two drop-down boxes 210 used to specify which roles may create a potential conflict-of-interest. Illustratively, the roles of "employee" and "vendor," have been selected.

As shown, dialog box 200 includes a text box 215 used to specify a minimum relationship strength and a text box 220 used to specify a rule relevance score for this rule. In one embodiment, the minimum relationship strength indicates how strong a detected relationship between the "employee" and "vendor" must be before an alert is triggered. For example, records indicating that an employee and a vendor have stayed at the same hotel would probably not provide a sufficient relationship strength to trigger an alert, where an inbound record indicating that the same two individuals were staying in the same room, or shared a common address or phone number, would probably provide a sufficient relationship strength to trigger an alert. Illustratively, the minimum relationship strength is set to "90" (out of 100) indicating a strong relationship between a given employee and vendor is required to trigger this alert.

Additionally, the relevance score in text box 220 is set to "85," providing a quantitative measure of the relevance of an event that fulfills the conditions of the rule. Similarly, FIG. 2B shows a dialog box 250. Like dialog box 200 of FIG. 2A, dialog box 250 includes a text-box 255 used to enter a rule name, two drop-down boxes 260 used to specify which roles may create a potential conflict-of-interest, and also includes a text box 265 used to specify a minimum relationship strength and a drop-down box 270 used to specify a rule relevance score for this rule. In the example of FIG. 2B, rule relevance is set using discrete values to describe the relevance of an alert generated by this rule. Specifically, relevance score 270 indicates that the relevance of an alert triggered by this rule is of "major." By specifying a relevance score (e.g., scores 220 and 270 of "85" and "major") users of the entity resolution application 120 may sort and filter by the assigned relevance. Thus, the entity resolution application 120 may provide users with the ability to sort and filter alerts by relevance of each individual alert generated using the same relevance detection rule.

Figure 3:
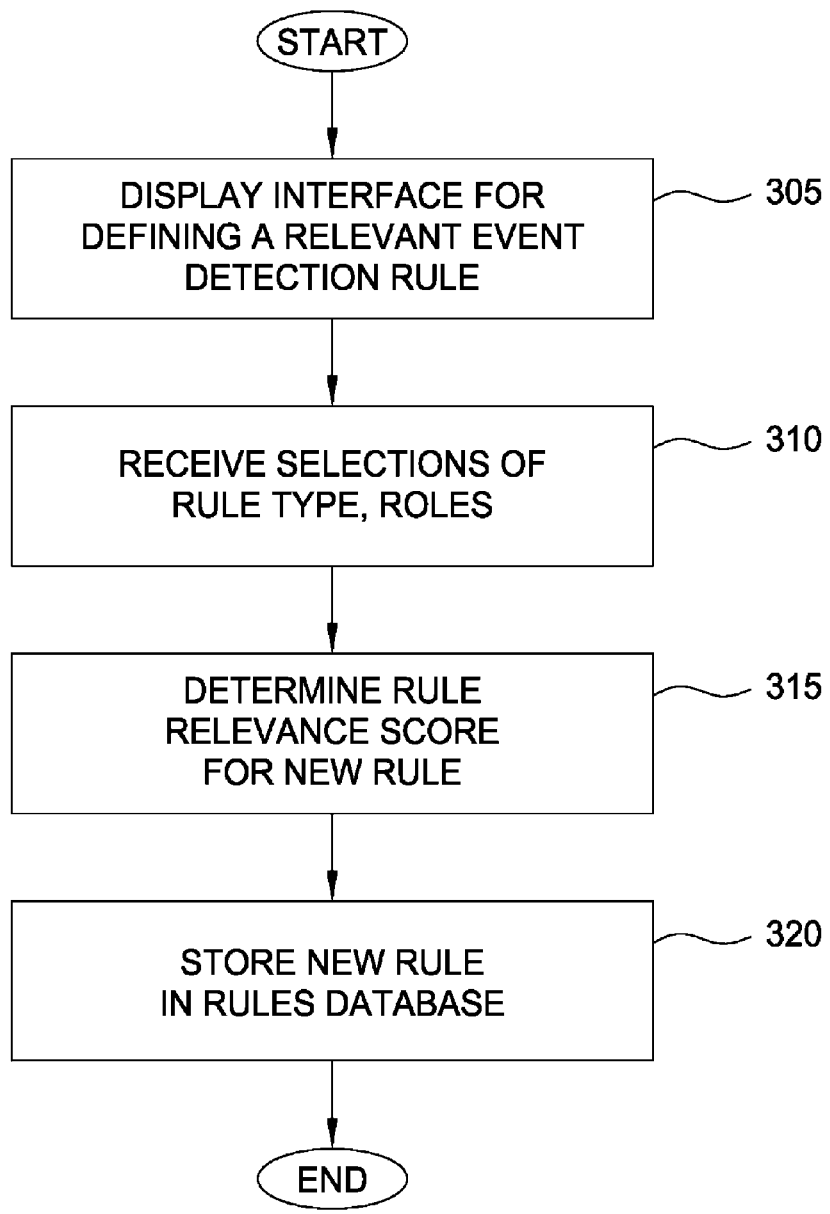
FIG. 3 illustrates a method for defining a relevance detection rule, according to one embodiment of the invention.

FIG. 3 illustrates a method 300 for defining a relevance detection rule, according to one embodiment of the invention. As shown, the method 300 begins at step 305 where the entity resolution application 120 displays an interface for defining a relevant event detection rule, e.g., dialog box 200 of FIG. 2A or dialog box 250 of FIG. 2B. At step 310, the user provides a selection of rule types, names, roles, or other information used to define a particular relevance detection rule. At step 315, a rule relevance score for the new rule is determined. For example, a user may specify a rule relevance score for the rule being defined using a dialog box like the one shown in FIGS. 2A and 2B. In one embodiment, the rule relevance score may specify a quantitative measure indicating the relative or absolute relevance of the rule being defined. Of course, other approaches for determining a rule relevance score may be used. As described above for example, the importance may be specified as a continuous range (e.g., a value from 1-100) or as one of a set of discrete tags (e.g., "minor" or "major"). At step 320, the new relevance detection rule may be stored in a database of rules.

Alert Relevance Rules

Once defined, inbound identity records may be evaluated against the relevance detection rule and against a collection of known entities and relationships between entities to determine whether the conditions specified by the rule have been satisfied. In one embodiment, when a relevance-detection rule is fulfilled (i.e.: a new identity record causes the rule to be satisfied) the entity resolution application 120 may be configured to generate an alert that may be sent out on a network, recorded in a database, or communicated or persisted in some way that it may be reviewed by an analyst. The generated alert may include direct or indirect references to the entities and/or identities that satisfied the relevance detection rule to be satisfied as well as a reference to the particular relevance detection rule that triggered the alert. Other informative state may also be included in the alert such as the timestamp of the alert generation. For alerts that pertain to a rule that detected a relationship of interest at zero or more degrees (e.g., "criminal is hotel guest" or "employee knows vendor") the alert may also include a relationship score indicating the strength of the relationship between entities of interest.

Further, in one embodiment, the entity resolution application 120 and alert analysis application 122 may include an alert relevance score which provides a quantitative measure indicating the relative or absolute relevance of a particular alert. The alert relevance score may be defined as a numeric or as a tagged value from a set of possible values ordered according to degree of relevance. In one embodiment, an alert relevance score may be defined as a function of the rule relevance score. For example, in a simple case, the alert relevance score may simply be set equal to the rule relevance score that trigged a given alert. As a more sophisticated example using the relevance detection rule shown in FIG. 2B, the alert relevance score may be calculated both from the rule relevance score "0.85" and the relationship strength determined for a pair of entities that satisfy the role conflict rule (e.g., 0.95). Thus, an alert based the role conflict rule for entities with a relationship strength of 0.95 results in an alert relevance score of 0.85*0.95=0.8075. In this example, the relationship strength and relevance detection score are normalized to result in a normalized alert relevance score between 0.0 and 1.0.

Figure 4:
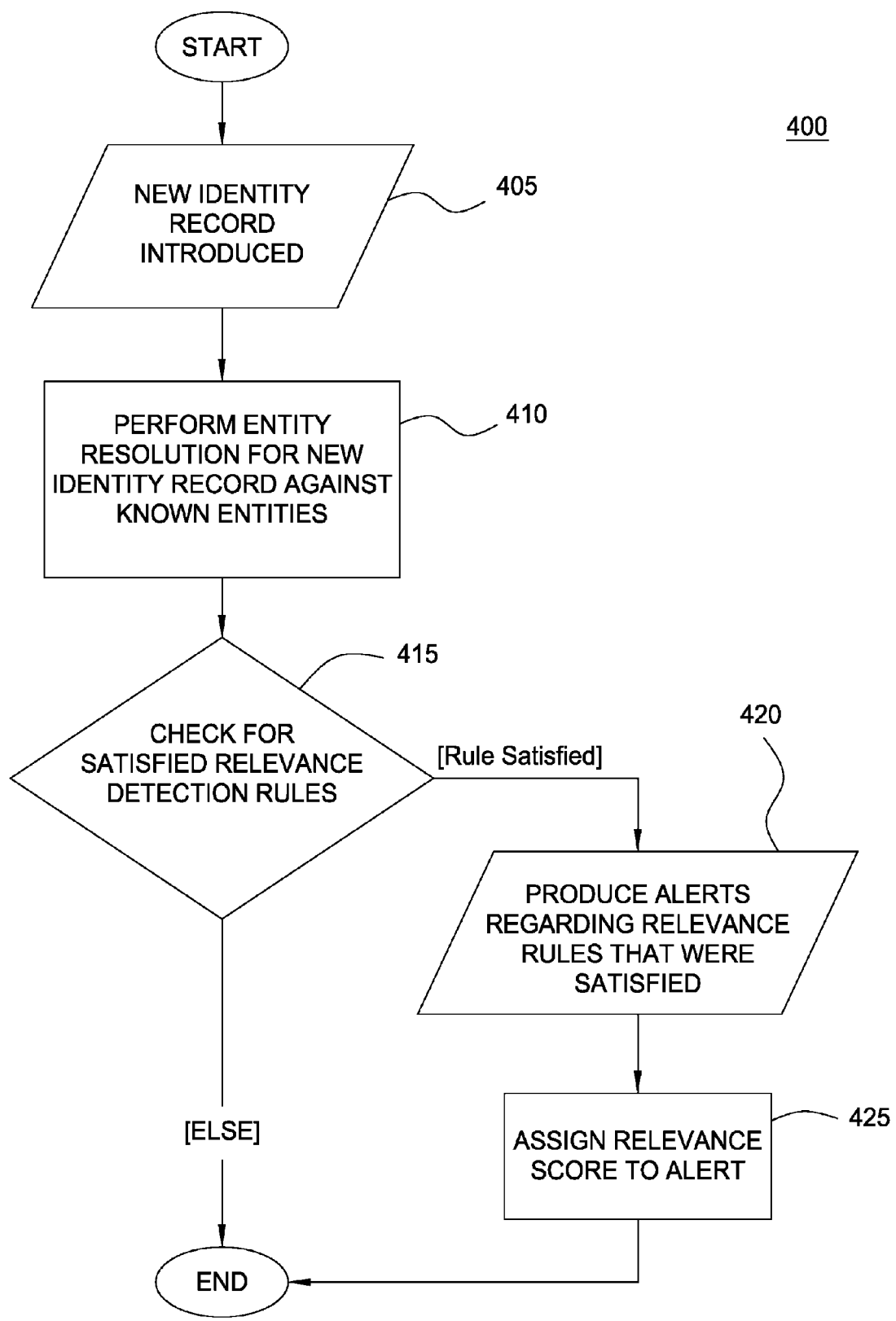
FIG. 4 illustrates a method for assigning a relevance score to an alert generated by an entity resolution system, according to one embodiment of the invention.

FIG. 4 illustrates a method 400 for assigning an alert relevance score to an alert generated by the entity resolution application 120, according to one embodiment of the invention. As shown, the method 400 begins at step 405 where the entity resolution application 120 receives a new inbound identity record. At step 410, the entity resolution application 120 resolves the new inbound record against known entities. If the identity record does not relate to any known entity, then a new entity record may be created. Otherwise, the inbound identity record may be added to the records of one or more known entities. At step 415, the entity resolution application 120 may determine whether any relevance detection rules are satisfied based on the inbound identity records introduced at step 405 and processed at step 410. For example, when the inbound record is added to a first known entity, the entity resolution system 120 may evaluate the first known entity, as well as relationships between the first known entity and other entities, against the set of relevance detection rules. If any relevance detection rules are satisfied, then at step 420, the entity resolution application 120 may generate an alert for each relevance detection rule that has been satisfied. Further, at step 420, an alert relevance score may be assigned to each alert generated at step 425.

In one embodiment, such alerts may be sorted based on the alert relevance score specified for each given rule. For example, FIG. 5 illustrates an example of graphical user interface component displaying a list of alerts generated by the entity resolution system 120, sorted by an assigned alert relevance score, according to one embodiment of the invention. As shown, a dialog box 500 displays a list of alerts 515 sorted using both a relevance filter 505 and a timestamp filter 510. In this example, the list of alerts is sorted by a relevance filter 505 limits the listed alerts to ones having an alert relevance score greater than "10" and a timestamp filter 510 limits the listed alerts to ones having a timestamp indicating the alert was generated in the last three days. Thus, as shown, the list of alerts 515 shows the most highly relevant alerts at the top of the list (two alerts with a relevance score of "91.0," and descending, ultimately, to the least relevant alert with a relevance of "11.8."

Illustratively, each alert includes an alert ID, the name of the alert rule that triggered the alert, a current disposition of the alert, a current relevance score, and a timestamp. Note, the disposition status assigned to an alert may represent a current status to an alert throughout an alert lifecycle. As discussed in greater detail below, in one embodiment, the current relevance score assigned to a given alert may be updated based on changes to disposition status throughout the alert lifecycle. For example, the last two alerts in the list of alerts 515 were triggered by the same relevance detection rule, but have substantially different relevance scores based on one with a status of "investigating" and one with a status of "closed."

In one embodiment, in addition to a rule relevance score assigned to a given alert, a relevance score assigned to an alert may be further refined using an alert relevance rule. As described above, the relevance detection rule and rule relevance score is assigned based on the rule that triggered an alert. Once an alert is triggered however, an alert relevance rule may be used to further refine an alert relevance score assigned to the alert. In one embodiment, the alert relevance rules provide configurable or hard-coded rules that provide similar inspection criteria as the relevance detection rules, except they operate on the alert and the entities and identities that are involved in an alert that has already been generated, rather than new identity records being resolved against existing entities. Thus, alert relevance rules serve to refine the alert relevance score of an existing alert. In one embodiment, alert relevance rules provide a set of qualifying criteria and an adjustment formula that operates on the alert relevance score.

A simple adjustment formula may specify a simple multiplier or a fixed amount to be added or subtracted, or some combination thereof (although far more sophisticated constructs such minimum and maximum values or any other mathematical functions may be provided as well).

For example, FIG. 6 illustrates an example of graphical user interface components used to configure an alert relevance rule in an entity resolution system, according to one embodiment of the invention. As shown, a dialog box 600 allows a user to configure an alert relevance rule related to possible fraud. In this specific example, a rule used to detect a situation where a store employee is facilitating false claims of personal injury. Of course, the components of dialog box 600 (or other interface element) used to define an alert relevance rule may be tailored to suit the needs of a particular case. In this example, dialog box 600 includes a text-box 605 used to enter a rule name and a text box 610 used to specify a multiplication factor used to increase the relevance of an alert that satisfies the conditions of the alert relevance rule. In this particular case, qualifying criteria 615 specifies a relevance detection rule of "employee knows/is personal injury plaintiff" and a store number attribute of "334."

Using this definition for an alert relevance rule, assume that an alert is generated because the relevance detection rules find that an "employee" and a "personal injury plaintiff" have a strong relationship (as determined from the known entities 132 and entity relationships 134). Such an alert may then be evaluated by the alert relevance rule displayed in dialog box 600. Suppose the entity resolution system 120 determines that one entities involved in the alert is an individual employed at Store #334 (assume for this example that store #334 is one with the last-year's highest expenditures due to personal injury lawsuits). Given that the qualifying criteria 615 of the alert relevance rule 600 have been satisfied, the multiplication factor specified in text-box 610, 1.5, is applied. This results in an increase to the alert relevance score by 50% over its current value.

Additionally, the alert relevance rules may be applied to a generated alert in a variety of ways. For example, the entity resolution application 120 may be configured to apply every qualifying rule to adjust the alert relevance score or may be configured to apply only the first (or the first N) qualifying rule(s) to adjust the alert relevance score. Alternatively, the entity resolution application 120 may allow users to define a group of alert relevance rules applied to a given alert when some (or all) of the alerts in the group are satisfied by the elements included in a given alert. Of course, other permutations or criteria may be specified for applying alert relevance rules to alerts generated by the entity resolution application 120, as may be appropriate for the needs in a particular case.

Figure 7:
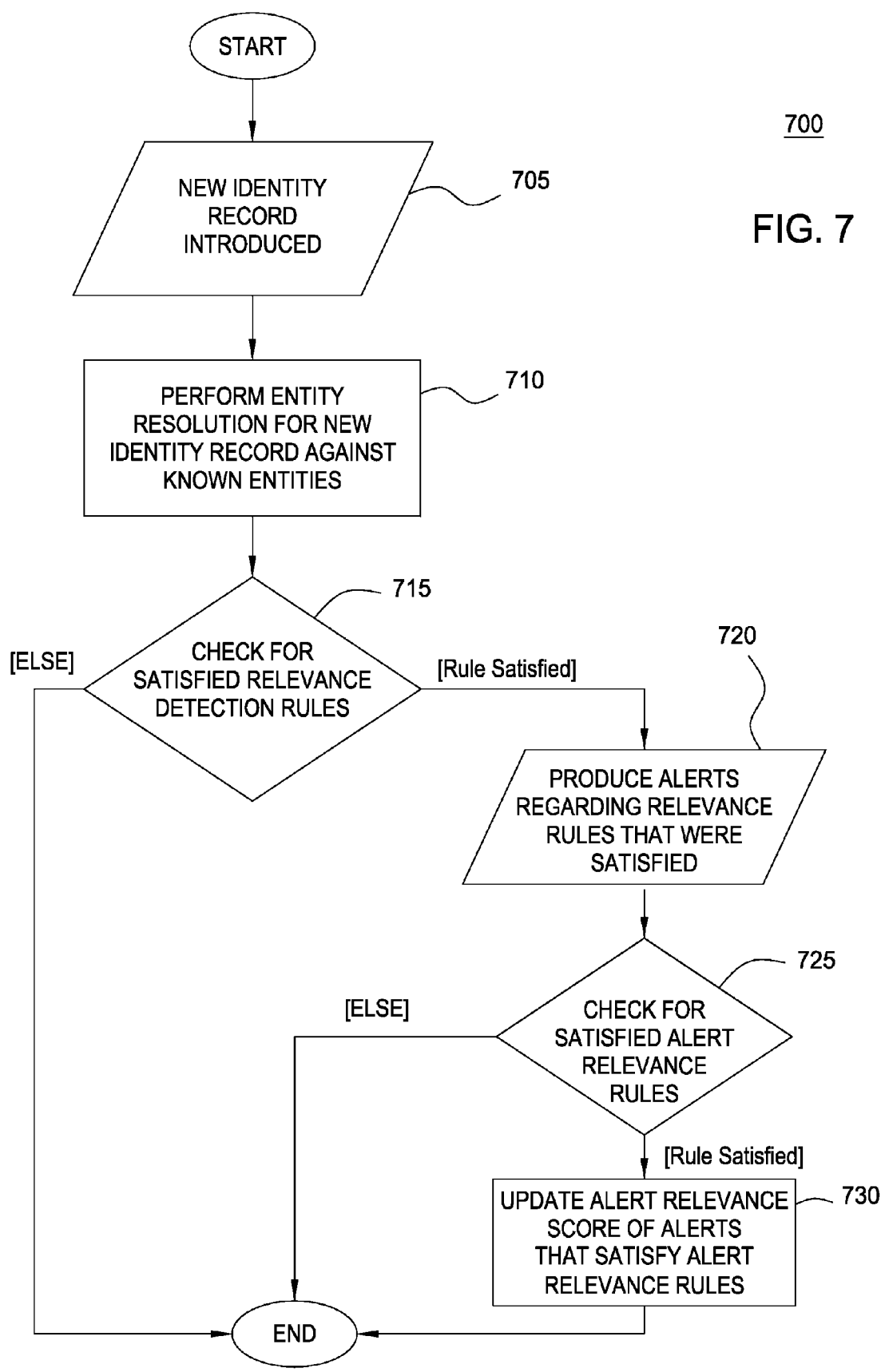
FIG. 7 illustrates a method for applying an alert relevance rule to a specific alert generated by an entity resolution system, according to one embodiment of the invention.

FIG. 7 illustrates a method 700 for applying an alert relevance rule to a specific alert generated by an entity resolution system, according to one embodiment of the invention. As shown, the method 700 begins at step 705 where the entity resolution application 120 receives a new inbound identity record. At step 710, the entity resolution application 120 resolves the new inbound record against known entities. If the identity record does not relate to any known entity, then a new entity record may be created. Otherwise, the inbound identity record may be added to the records of one or more known entities. At steps 715, the entity resolution application 120 may determine whether any relevance detection rules are satisfied based on the identity record resolved at step 710. And at step 720, one or more alerts for any such relevance detection rules may be generated. At step 725, the entity resolution application 120 may evaluate alerts generated at steps 720 and 725 to determine whether any alert relevance rules are satisfied (e.g., the alert relevance rule shown in FIG. 600 related to possible fraud at a specific retail location). If so, at step 730, the entity resolution application 120 may be configured to updated the alert relevance score of alerts that satisfy the qualifying criteria listed in a given alert relevance rule.

Alert Analysis and Disposition

Embodiments of the invention may extend the functionality of the described entity resolution application 120 and alert analysis application 122 to allow an analyst to assign a disposition status to a generated alert as well as to maintain a plurality of alert relevance scores, each representing an alert relevance score of the alert at different points in an alert lifecycle. Doing so may provide a historical record of the alert relevance score value, with the most recent value representing the current alert relevance score for the alert. For example, in a simple case, an alert may have two alert relevance scores: one determined at the time of alert creation (i.e., an original alert relevance score) and another specifying the current alert relevance score. A more sophisticated implementation could provide a list of alert relevance score values with timestamps or sequence numbers. Further, each score could include a comment or reason code indicating what caused the alert relevance score value to be updated. In such a case, the oldest alert relevance score in the list represents the original alert relevance score while the most recent value in the list represents the current alert relevance score.

In one embodiment, the alert analysis application 122 (or an analyst) may assign a disposition status to an alert. For example, the alert analysis application 122 may assign a disposition status of "NEW" to each new alert generated and an analyst may transition the alert status from "NEW" to "OPEN" to "UNDER INVESTIGATION." Of course, the particular disposition statuses available for an alert may be tailored to suit the needs of a particular case. Further, in one embodiment, the current alert relevance score assigned to an alert may depend, in part, on the disposition status of that alert at any point in the alert lifecycle. Additionally, the alert analysis application 122 may use the alert relevance score to sort alerts in ascending or descending order based on either original alert relevance score or the current alert relevance score. This sorting may be the default ordering of generated alerts, or a control may be provided by the alert analysis application 122 to allow an analyst to specify how to sort a group of alerts. (e.g., in descending or ascending order of the historic or current alert relevance scores). Further, the alert analysis application 122 may allow the analyst to filter generated alerts based on a minimum, maximum, range, or exact value of an original or current alert relevance score, as well as a variety of other criteria.

For example, assume an entity resolution system 120 and alert analysis application 122 configured to provide a current alert relevance score that can be tracked independently of the original alert relevance score. In such a case, when an analyst changes an alert disposition status (e.g., "BENIGN", "SERIOUS" or "CRITICAL"), the alert analysis application may modify the current alert relevance score. In a simple case, a change in disposition may change the alert relevance score to a fixed value (e.g., if the disposition is set to "BENIGN" then set score to zero). Alternatively, the alert relevance score may be updated as a function of the current score (e.g., if the disposition status is changed to "SERIOUS" then multiply the current alert relevance score by a specified factor).

Figure 8:
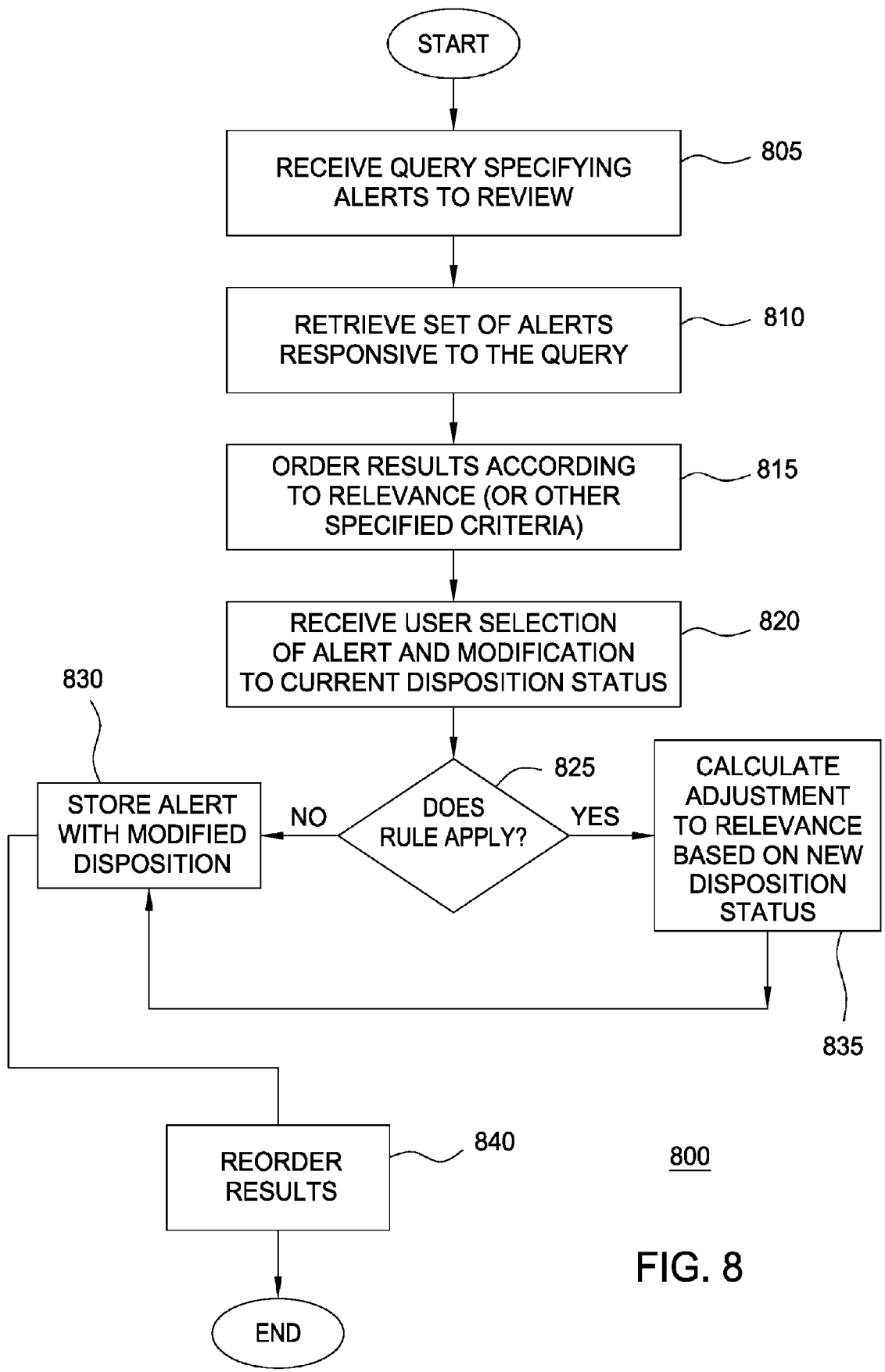
FIG. 8 illustrates a method for updating an alert relevance score assigned to a specific alert based on a change in a lifecycle disposition status, according to one embodiment of the invention.

FIG. 8 illustrates a method 800 for updating an alert relevance score assigned to a specific alert based on a change in a lifecycle disposition status, according to one embodiment of the invention. At step 805, the alert analysis application 122 receives a query specifying criteria used to identify a set of alerts to present to an analyst. In a simple case, the analyst may simply request that the system retrieve all alerts or all alerts assigned a given disposition (e.g., new). Of course, the alert analysis application 122 may allow an analyst to specify a variety of more sophisticated criteria in selecting alerts for display. For example, FIG. 5 illustrates a dialog box where users may specify filters limiting what alerts are displayed. However specified, at step 810, the alert analysis application 122 retrieves a set of alerts consistent with the selection criteria. And at step 815, the alert analysis application 122 may order the set of results according to relevance (or other specified criteria). The ordered results may then be displayed to the analyst (e.g., the list of alerts 515 illustrated in FIG. 5).

At step 820, the alert analysis application 122 may receive a selection of one of the alerts along with a modification to the current disposition status of that alert. For example, for a new alert, the analyst may transition the status from "NEW" to "OPEN," which might mean that the analyst has taken responsibility for processing the new alert, but not yet began a substantive investigation. Other examples of likely transitions include transitioning from "OPEN" to "UNDER INVESTIGATION" and from "UNDER INVESTIGATION" to "BENIGN" or "CRITICAL." At step 825, after the disposition status of a rule is changed, the alert analysis application 122 may determine whether a disposition status rule applies to the change in disposition status made at step 820. If so, then at step 835, the alert analysis application 122 may calculate an updated alert relevance score based on the modified disposition status. In one embodiment, the score calculated at step 835 may replace the current alert relevance score assigned to the alert. Alternatively, in an embodiment that maintains a history of alerts, the score calculated at step 835 may be added to the list of alert relevance scores. At step 830, the alert analysis application 122 stores the alert with the modified disposition. Additionally, at step 840, the alert analysis application 122 may reorder the displayed list of results, based on a change in the alert relevance score calculated at step 835.

FIGS. 9A-9B illustrate an example of graphical user interface components configured to display changes to an alert relevance score for a given alert based on changes in lifecycle disposition, according to one embodiment of the invention. As shown in FIG. 9A, a dialog box 900 displays an alert detail 905 for an example alert and an alert history list 910 displaying a list of prior relevance scores for this example alert (including an original alert relevance score of 75.8 and a current alert relevance score of 97.5). A button 915 labeled "change disposition" may be used to change transition the alert dispositions status from one status to another.

In one embodiment, an alert relevance score may also be updated when an alert is transitioned from one alert disposition status to another. For example, transitioning from "BENIGN" to "SERIOUS" may typically result in an increase in an alert relevance score, while transitioning to "SERIOUS" from "CRITICAL" may typically result in a decrease to an alert relevance score. This example illustrates a scenario where the change to the alert relevance score is based on both the alert disposition status which an alert is transitioned to as well as the disposition status an alert is transitioned from. Of course, what alert disposition status are available, and how any given transition affects the alert relevance score (either as an increase or a decrease thereto) may be tailored to suit the needs of a particular case.

In this example, the alert shown in dialog box 900 was triggered by a relevance detection rule named "Employee knows/is Vendor," and was assigned an original alert relevance score of 75.8. Additionally, an alert relevance rule was applied to this alert to adjust the alert relevance score to 87.8 (based on an alerts generated by the "Employee knows/is Vendor" relevance detection rule that originate from a "store #512"). The third entry in the alert history list 910 shows the alert being transitioned from "NEW" to "BENIGN" and a corresponding drop in the alert relevance score from 87.8 to 15.3. This could occur, for example, after an analyst has investigated the job functions assigned to the employee identified in this alert and determined that the alert, while valid, does not represent a genuine threat of fraud. Illustratively, this result is documented in a comment filed 912 entered by the analyst when the alert is transitioned from "NEW" to "BENIGN." Subsequently, the alert is transmitted from "BENIGN" to "THREAT" based on a change in job functions assigned to the employee identified in this alert of 15.3 to 97.5, also notated in a comment filed 914. Note in this example, alert relevance score is updated based on the application of an alert relevance rule (indicated by the "[system]" entries in the "user" column of the alert history list 910) as well as on express changes to the disposition status of this alert made by an analyst (indicated by the "jsmith" entries in the "user" column of the alert history list 910).

FIG. 9B illustrates a dialog box 950 that allows a user to specify a disposition configuration to update an alert relevance score based on a change in disposition status. In this example, dialog box 950 includes a text-box 955 used to enter a disposition name and a text-box 960 used to provide a description for this disposition configuration. Additionally, a drop down box 965 may be used to specify whether a change to the disposition listed in text box 955 should trigger an update to the current alert relevance score assigned to a given alert. As shown, drop down box 965 is set to "YES" indicating that when an alert disposition status is transitioned to "BENIGN," the alert relevance score should by updated. Dialog box 950 also includes interface components that allow a user to specify one or more transformations 970 to apply to the alert relevance score whenever the specified change in disposition status occurs. Illustratively, when an alert disposition status is transitioned to "BENIGN," the transformations indicate to multiply the current relevance score by 0.2 (effectively reducing it by 80%) and then reducing the score by 10 points. Also the alert relevance score is bound to a minimum of "0" meaning that if the alert score is reduced to "0," then it does not subsequently increase by processing any further transformations 970. In this example, a user may add additional transformations 970 using a link 975 as well as change the order in which existing transformations 970 are applied using one of links 980.

Duplicate Alerts in an Entity Resolution System

One problem often faced by an entity resolution system is the issue of duplicate alerts, i.e., one or more identical or near-identical alerts generated using the same entities and/or identities. For example, duplicate alerts may occur when a new inbound identity records resolves to one of the entities for which an alert was previously generated. Duplicate alerts pose a problem for analysts using the entity resolution system 120 and alert analysis application 122 as a duplicate alert cannot be discarded summarily because of the potential to miss important or critical information; however, analyzing each duplicate alert may be a time consuming process. Further, the alert relevance score initially assigned to a duplicate alert is typically the same as the relevance of previous identical alert that was already reviewed by an analyst. Thus, even though a prior alert may have been transitioned to a state of "BENIGN" (and thus have a low alert relevance score), a new record may generate a new alert with a high alert relevance score, even though based on the same entities and/or identities determined to be "BENIGN" for the prior alert.

Accordingly, embodiments of the invention may address this deficiency by adjusting alert relevance scores assigned to a duplicate alert, e.g., by defining methods by which the alert relevance score of duplicate alerts are modified by a transformation that takes into account the alert relevance scores of previously generated duplicate alerts. A "duplicate alert" generally refers to two or more alerts related to the same entities and/or identities triggered by the same relevance detection rule. Alternatively, two alerts might be considered duplicates only if they are generated relative to the same entities having the same relationship strength between them at the time of alert generation. More generally, embodiments of the invention may allow users to configure what determines if one alert is a duplicate of another. Examples of an how to define a duplicate alert include:

- Alerts on the same entities generated from the same relevance detection rule.
- Alerts on the same identities generated from the same relevance detection rule (as identities can move from entity to another over time).
- Alerts on the same entities generated from the same relevance detection rule where the relationship strength between the entities is unchanged.
- Alerts on the same entities that were generated from the same Relevance Detection Rule where the composition (i.e., source identities) of the entities involved has not changed.

Of course, these or other definitions of what qualifies as a duplicate alert may be tailored to suit the needs in a particular case.

In one embodiment, the alert analysis application 122 may be configured to modify the alert relevance score of a newly generated alert upon (or following) creation to be a function of the original alert relevance score and the current alert relevance score of one or more of the previously generated duplicates of that alert. As a simple example, the current alert relevance score of the last previous duplicate is assigned to a newly generated duplicate alert.

Figure 10:
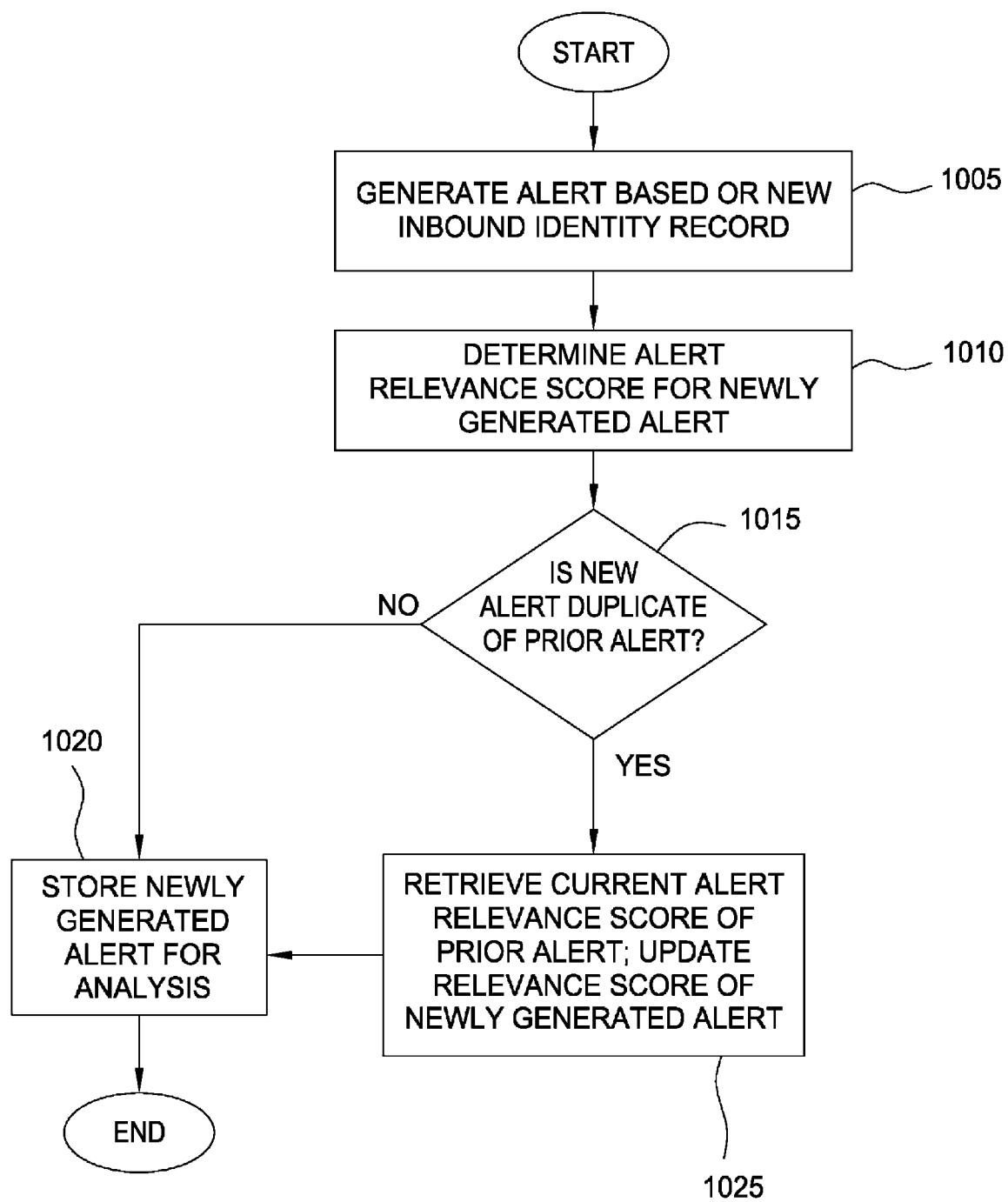
FIG. 10 illustrates a method for updating an alert relevance score based on duplicate alerts, according to one embodiment of the invention.

FIG. 10 illustrates a method 1000 for updating an alert relevance score based on duplicate alerts, according to one embodiment of the invention. As shown, the method 1000 begins at step 1005, where the entity resolution application 122 generates an alert based on a new inbound identity record. At step 1010, the entity resolution application 122 may calculate an original alert relevance score, according to the techniques described above. At step 1015, the entity resolution application 122 may be configured to determine whether the alert generated at step 1005 is a duplicate of another alert (e.g., a duplicate of one of the current alerts 124 of FIG. 1). If a duplicate is found, then at step 1025, the entity resolution application 122 may be configured to retrieve an alert relevance score (or scores if an original, current, or list of relevance scores are available) and update the alert relevance score calculated at step 1010 for the alert generated at step 1005. Once updated, the alert (and the updated alert relevance score) may be stored in the set of current alerts 124 of FIG. 1 (step 1020) and the method 1000 terminates.

Additionally, the alert relevance score of one alert may be updated whenever the alert relevance score of a duplicate alert is itself updated. In one embodiment, however, the current alert relevance score of a duplicate alert is updated only for alerts that are not under review by an analyst (e.g., those alerts that do not have an assigned disposition or have not been opened by an analyst). Doing so may allow a current alert relevance score that results from a disposition assigned by an analyst to take precedence over any automatic scores generated based upon any duplicate alerts. That is, once the analyst is involved, the alert analysis system 122 may assume that the analyst is more qualified to manage the relevance of the alert through the mechanisms provided by the alert analysis System 122.

Figure 11:
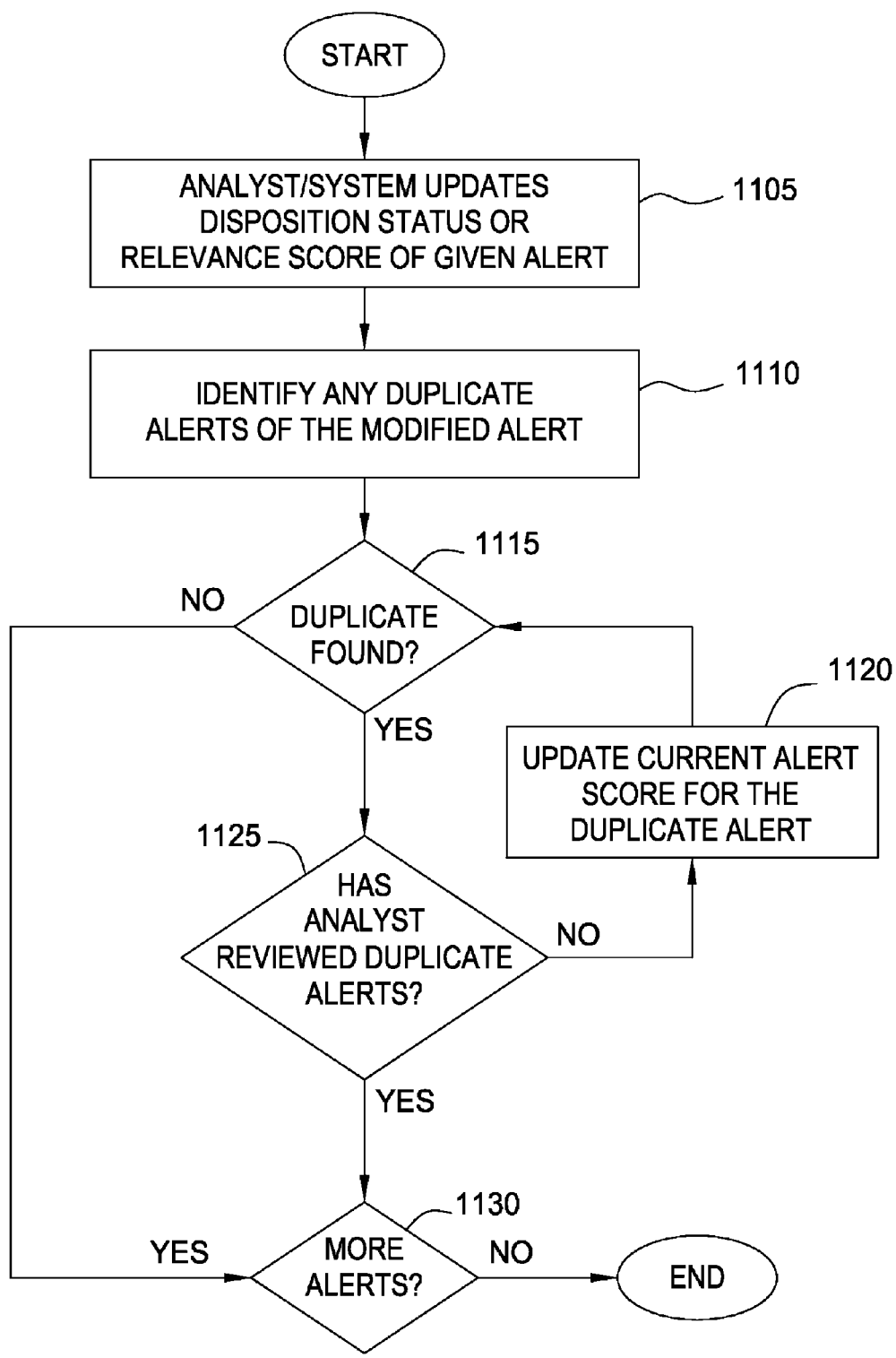
FIG. 11 illustrates a method for updating an alert relevance score of one alert based on a change in disposition to a duplicate alert, according to one embodiment of the invention.

FIG. 11 illustrates a method 1100 for updating an alert relevance score of one alert based on a change in disposition to a duplicate alert, according to one embodiment of the invention. As shown, the method 1100 begins at step 1105 where an analyst (or the application 122) updates a disposition status assigned to a given alert. Alternatively, the analyst (or the application 122) may perform an action that updates an alert relevance score assigned to the alert.

At step 1110, the alert analysis application 122 may identify any duplicate alerts related to the alert updated at step 1105. If any duplicates are found (step 1115), then at step 1125, the alert analysis application 122 may be configured to determine whether an analyst has reviewed the duplicate alert (s) identified at step 1110. If not, then at step 1120, the current alert relevance score may be updated, based on the changed disposition status of the alert from step 1105. For example, the current alert relevance score of a duplicate alert (not-yet-reviewed by an analyst) may be determined as a weighted average of the original alert relevance score of the new alert and the current alert relevance score of the duplicate alert. Further, when an alert which has been duplicated by a subsequent alert has its current alert relevance score updated, and the subsequent alert has not yet had a disposition assigned, the alert analysis application 122 may update the current alert relevance score of the duplicate alert according to the same formula. At step 1130, if more duplicate alerts were identified at step 1110, then the alert analysis application 122 return to step 1115 to determine whether to update the current alert relevance score for another duplicate alerts. This process may then continue until the current alert relevance score of each duplicate alert has been evaluated.

FIGS. 12A-12C illustrate example graphical user interface components used to configure a duplicate alert detection and resolution policy in an entity resolution system, according to one embodiment of the invention. As shown in FIG. 12A, a dialog box 1200 includes a set of radio buttons 1205 that allow a user to specify settings for when a newly generated alert should be treated as a duplicate alert. In this example, a new alert may be treated as a duplicate when a previous alert was generated based on the same alert rule, for the same entities, without a change in relationship strength between entities. The other radio buttons 1205 in dialog box 1200 provide examples of other definitions of a duplicate alert.

Dialog box 1200 also includes a second set of radio buttons 1210 used to specify how the alert analysis application 1200 should treat a given duplicate alert. In this example, the selected radio button indicates the alert relevance score of a duplicate alert should be weighted based on an average of a previous alert. Other options in this example include both suppressing duplicate alerts completely (i.e., discard any duplicate alerts) or treating a duplicate alert as any other (i.e., ignore the fact that the alert may be a duplicate). FIG. 12B illustrates another example of a dialog box 1215 used to configure a duplicate alert policy in an entity resolution system. As shown, a set of radio buttons 1220 display the same options for defining when one alert should be treated as a duplicate of another alert as the options shown in dialog box 1200. Additionally, however, a text box 1225 allows a user to specify a relevance weight to use in calculating a weighted average when generating an alert relevance score for a duplicate alert.

FIG. 12C, a dialog box 1230 that allows a user to configure a relevance detection rule for a "role conflict," e.g., a rule used to detect situations where a vendor and an employee share a strong personal relationship, creating potential for a conflict-of-interest. In this example, dialog box 1230 includes a text-box 1235 used to enter a rule name and two drop-down boxes 1240 used to specify which roles may create a potential conflict-of-interest. Illustratively, the roles of "employee" and "vendor," have been selected. Dialog box 1230 also includes a text box 1245 used to specify a minimum relationship strength and a text box 1250 used to specify a rule relevance score for this rule. Components 1235-1250 correspond to the graphical interface components shown in dialog box 200 of FIG. 2A. Additionally, dialog box 1230 includes a text-box 1225 used to specify a relevance weight of previous duplicates. Thus, the dialog box 1230 illustrates an example where the relevance duplicate policy may be specified as part of the definition of a relevance detection rule.

Using Alert Relevance Score to Determine Relevance of Entities and Identities

Embodiments of the invention also provide an alert analysis system configured to determine and assign a relevance score to an entity or identity based, at least in part, on the alerts that those particular entities and identities are involved in. For example, at one end of the spectrum, a given individual may generate multiple alerts (not duplicates), that are each ultimately disposed of by an analyst as not presenting a genuine threat (i.e., each alert turns out to be a false positive). In such a case, the alert analysis system may be configured to significantly reduce the alert relevance score assigned to any subsequent alert generated based on an entity relevance score assigned to this entity. The entity relevance score itself may be calculated from alert relevance score of each alert generated by this entity (i.e., each false positive alert, ultimately assigned a "BENIGN" disposition). In such a case, the entity relevance score for the entity representing this individual is likely to be a low value, indicating that this is not a very relevant entity, even though involved in potentially many alerts.

At the other end of the spectrum, an otherwise minor alert may be of critical importance when triggered by certain individuals known to have engaged in unwanted activity. For example, an entity representing an individual involved in many alerts with an alert disposition status of "CRITICAL" or "MAJOR" (or similar) may be assigned a high entity relevance score. In such a case, the alert analysis system may be configured to significantly increase the alert relevance score assigned to an alert generated based on this individual.

In one embodiment, the contribution to a given entity relevance score may be determined from each alert in which the given entity is involved. The entity relevance score may provide a quantitative measure of relevance for at least some known entities included in the entity resolution system 120 and alert analysis system 122. Additionally, the entity relevance score may provide a numerical value or may be a tagged value from an ordered set of possible values (e.g., "MINOR," "SIGNIFICANT," and "MAJOR") where values are ordered according to the degree of relevance. The entity relevance score may be used to represent the perceived the importance of the entity, and indirectly indicates the importance of identities included in the entity.

For example, the entity relevance score may be calculated as the square root of the sum of the squares of all current alert relevance scores for all alerts tied to that entity. Using this approach, the larger the entity relevance score the more important the entity. Further, the entity resolution system 120 and the alert analysis system 122 may be configured to determine which entities frequently show up as false positives by computing an entity relevance score based on the original alert relevance scores and then comparing this with the disposition of the original alerts. Entities with high entity relevance scores, based on high original alert relevance scores, but "BENIGN" or similar alert dispositions indicate that the entities are frequently triggering alerts, but apparently have some sort of data that is lending itself to becoming a false positive with the current relevance detection rules.

As stated, an "entity" generally refers to an organizational unit used to store identity records that are resolved at a "zero-degree relationship." That is, each identity record associated with a given entity is believed to describe the same person, place, or thing. Thus, one entity record may reference multiple individual identities. In one embodiment, the entity records (e.g., the known entities 132 of FIG. 1) may be augmented to include one or more entity relevance scores. The entity relevance score may provide a measure of the relevance of the entity at given points in time. Further, each identity within a given entity may include one or more identity relevance scores that provide a quantitative measure of a perceived relevance of the identity at given points in time. In a particular embodiment, the entity resolution system 120 and alert analysis system 122 may be configured to compute the entity relevance score based on the alert relevance score assigned to each alert in which the entity is involved. Further, the identity relevance score may be based on the entity relevance score of each associated with a given identity and/or the alert relevance scores of the alerts that directly pertain to the specific identity record.

In a simple case, the identity relevance score may be set to the entity relevance score of the entity to which it is associated. However, in a more sophisticated approach, the identity relevance scores may be calculated from a combination of the current alert relevance score of each alert associated with the identity and the current entity relevance score. By utilizing the alert relevance values of the individual alerts, the alert analysis application 122 can weigh the alerts directly involving data related to one identity more heavily than alerts involving other identities within the same entity. That is, in the appropriate case, the entity resolution system 120 and the alert analysis system 122 may be configured to treat identities within the same entity differently from one another, e.g., where one entity seems to provide a locus for fraud or other nefarious behavior, the identity relevance score associated with the badly-behaving identity should be higher than others, even relative to other identities within the same entity.

Figure 13:
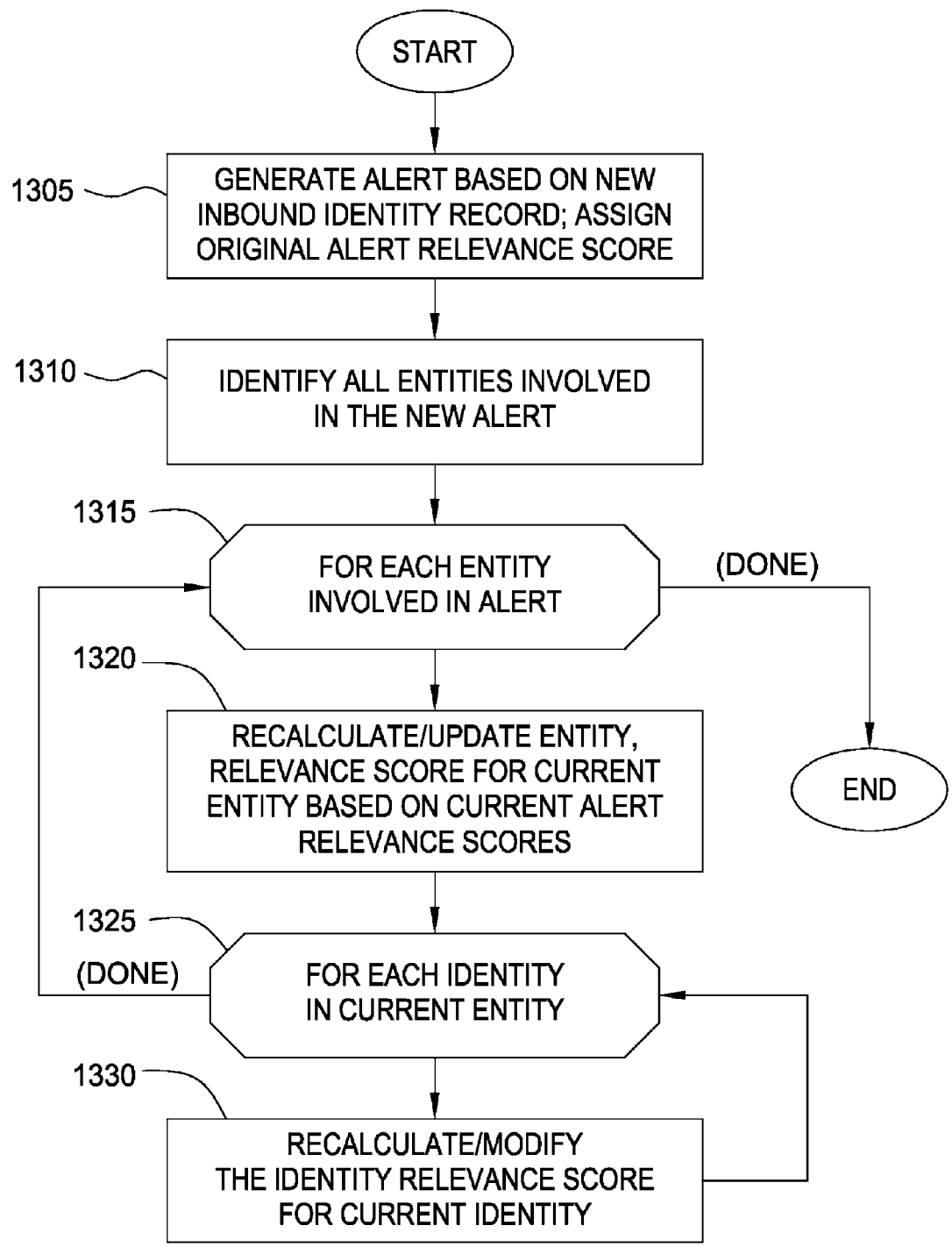
FIG. 13 illustrates a method of updating an entity or identity relevance score, based on the alert relevance scores of alerts in which they are involved, according to one embodiment of the invention.

FIG. 13 illustrates a method of updating an entity or identity relevance score, based on the alert relevance scores of alerts in which they are involved, according to one embodiment of the invention. As shown, the method 1300 begins at step 1305, where the entity resolution application 120 generates a new alert based on a new inbound identity record and assigns an original alert relevance score to the newly generated alert. Alternatively, method 1300 may begin when an analyst changes an alert disposition status of an existing alert, resulting in an updated current alert relevance score for the existing alert. In the latter case, the alert analysis application 122 may be configured to update/create an entity relevance score and/or identity relevance score for entities/identities associated with the alert having an updated alert dispositions status.

At step 1310, the entity resolution application 120 may determine each entity involved in the newly generated alert. For example, using the "role conflict" relevance detection rule of FIG. 14A, the entities representing the roles of "Employee" and "Vendor" would be identified. At step 1315, a loop begins to process each entity identified at step 1310. At step 1320, the entity resolution application 120 may calculate or modify the entity relevance score for a current entity based on the current alert relevance scores of the alerts associated with the current entity.

As stated, one entity may reference multiple identities associated with that entity, where each different identity is nevertheless believed to represent the same individual. Accordingly, at step 1325 a loop begins to process each identity included in the current entity record being processed (i.e., the entity record processed on a given pass through the loop that begins at step 1315). At step 1330, the entity resolution application 120 may calculate or modify the identity relevance score for the identity based on the current alert relevance scores of the alerts and/or the entity relevance scores. After processing each identity associated with a given entity, the method 1300 returns to step 1315 to process another entity record, and each identity associated therewith.

Figure 14A:
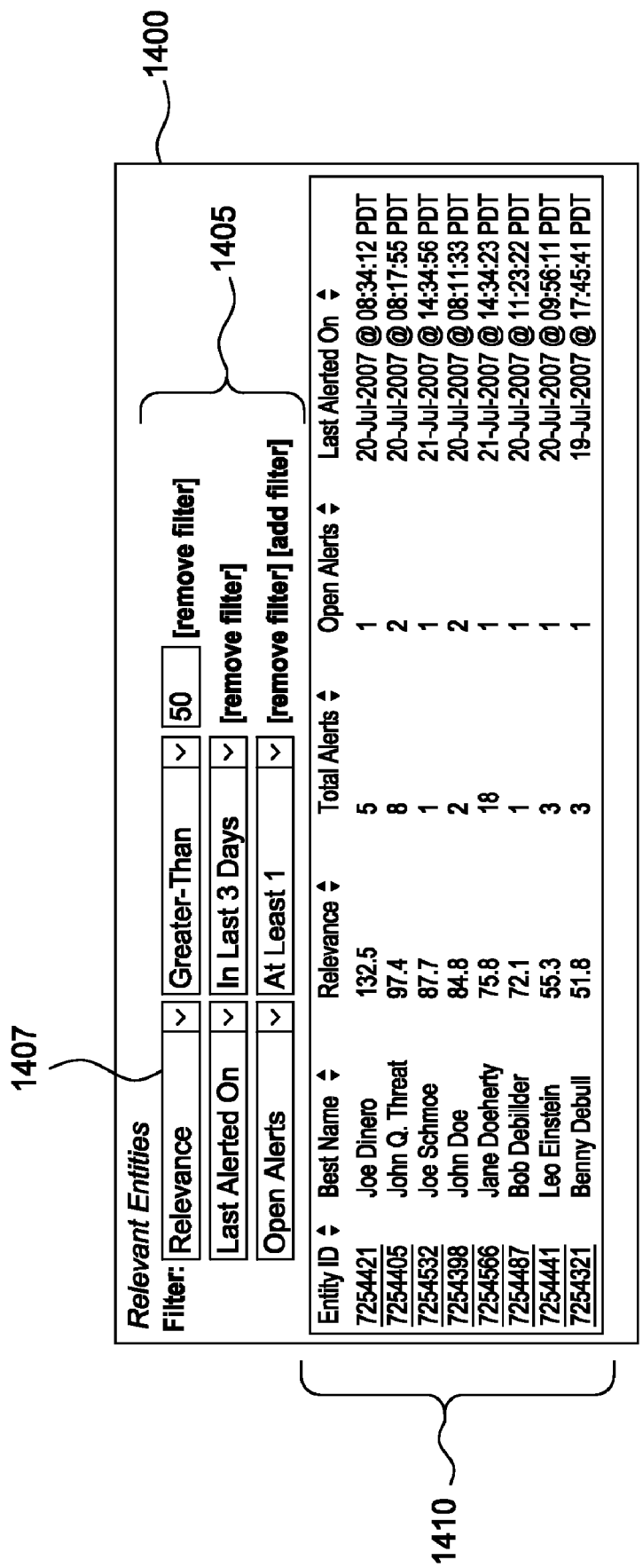

FIGS. 14A-14B illustrate examples of graphical user interface components configured to display entity and identity relevance scores, according to one embodiment of the invention. As shown in FIG. 2A, a dialog box 1400 displays a list of entities 1410 selected from a set of current alerts based on a set of filter criteria 1405. In this particular example, a first filter 1407 specifies that the list of entities 1410 should only include entities with an entity relevance score greater than 50. The other two filters specify that the list of entities 1410 should also be restricted to alerts generated in the last three days and entities that include at least one open alert. Of course, the components of dialog box 1400 (or other interface element) used to present a set of entities and entity relevance scores may be tailored to suit the needs of a particular case.

FIG. 14B illustrates a dialog box 1450 that allows a user to navigate an entity that includes multiple identities. In this example, the dialog box 1450 displays details of a hypothetical entity with a list of source identities that has controls for both filtering and sorting according to identity relevance score. In this example, an entity detail section 1455 presents demographic information related to "Joe Schmoe," including a name, address, phone number, etc. The information in the entity detail section 1455 presents a perceived best set of demographic data, based on the available identity records associated with this entity. The entity detail section 1455 also shows a relevance score for this entity of "97.5." Dialog box 1450 also interface elements 1460 which may be used to display additional information about this entity. Illustratively, other known names, known addresses, known phone numbers, and known identifies for this hypothetical entities. Dialog box 1450 also includes a list of identities 1465 associated with this entity.

Advantageously, embodiments of the invention described above provide an entity resolution system and alert analysis system configured to process inbound identity records and to generate alerts based on relevant identities, entities, conditions, activities, or events.

The process of resolving identity records and detecting relationships between entities may be performed using a predetermined or configurable entity resolution rules. For example, consider the following scenario where an example entity includes the following three identity records:

| Identity 1: | Identity 2: | Identity 3: |
|---|---|---|
| Source: FBI Watch List | Source: HR Database | Source: PO Database |
| Role: Criminal | Role: Employee | Role: Vendor |

-continued

| Identity 1: | Identity 2: | Identity 3: |
|---|---|---|
| Name: John Doe | Name: John H. Doe | Name: Johnny Doe |
| SSN: 111-11-1111 | SSN: 111-11-1111 | SSN: 111-11-1111 |

Note, in this example, each identity record includes a different variation of a similar name, but each name has the same social security number. Thus, the entity resolution application 120 may resolve these three records to a common entity representing all three identities and store this entity (and each of the identity records) in a set of known entities 132. Now suppose the entity resolution application 120 includes the following two relevance detection rules used to manage potential conflicts-of-interest:

"Employee knows/is Vendor"—detects cases where an employee knows or is a vendor.

"Employee knows/is Criminal"—detects cases where an employee knows or is a criminal.

Based on these two rules and the three identity records, the entity resolution system 120 may generate the following two alerts for this entity:

"Employee knows/is Vendor"—Alert Relevance Score=88

"Employee knows/is Criminal"—Alert Relevance Score=99

The first alert is generated due to a role conflict caused by Identity 2 and Identity 3 being part of the same entity (zero-degree relationship). That is, a conflict exists because the "John H. Doe" identity from a human resource database indicates that individual is an employee, while at the same time the "Johnny Doe" identity from a purchase order database indicates that this individual is also a vendor. The second alert due to a role conflict caused by Identity 1 and Identity 2 being part of the same entity (zero-degree relationship)

In this example, an entity relevance score for this entity may be computed as "123" as the square root of the sum of the squares:

Entity relevance score=square root($88^2+99^2$)=132.5.

Further, in this example, the identity relevance scores for each identity may be computed as the average of the entity relevance score and the square root of the sum of the squares of the alert relevance scores for the alerts involving a given identity. Doing so accounts for all alerts (since the entity relevance score is based on all alerts for the entity), but also weights the alerts involving the particular identity higher. Thus, in this example, the identity relevance scores for the three identity records listed above may be calculated as follows:

Identity relevance score for identity 1:

(entity relevance score+square root($99^2$))/2=(132.5+99)/2=115.8

Identity relevance score for identity 2:

(entity relevance score+square root($88^2+99^2$))/2=(132.5+132.5)/2=132.5

Identity relevance score for identity 3:

(entity relevance score+square root($88^2$))/2=(132.5+88)/2=110.3

In this example, identity 2 is more relevant than identity 1 and identity 3 because identity 2 is involved in more alerts and the relevance score from each of those alerts is taken into account. Identity 1 and identity 3 were involved in the same number of alerts, however, the relevance of the alert involving identity 1 was higher, and therefore identity 1 is more relevant than identity 3. Based on this information, the analyst may readily focus on the alerts having the highest relevance.

While the foregoing is directed to embodiments of the present invention, other and further embodiments of the invention may be devised without departing from the basic scope thereof, and the scope thereof is determined by the claims that follow.

What is claimed is:

1. A computer-implemented method for processing identity records received by an entity resolution system:
   receiving a first identity record;
   associating the first identity record with a first entity by one of resolving the first identity record to an existing entity in the entity resolution system and creating a new entity in the entity resolution system;
   evaluating at least the first entity against one or more conditions specified in a relevance detection rule;
   upon determining that the one or more conditions specified by the relevance detection rule are satisfied:
   generating a first alert, and
   assigning an original alert relevance score to the first alert, determined, at least in part, on a rule relevance score associated with the relevance detection rule; and
   upon determining that the first alert is a duplicate of a second, previously generated, alert, wherein the second alert was generated based on at least a second identity record associated with the first entity:
   retrieving at least an alert relevance score associated with the second alert, and
   assigning a current alert relevance score to the first alert, determined, at least in part, on the alert relevance score associated with the second alert and the original alert relevance score assigned to the first alert; wherein each of the alert relevance scores provides a quantitative measure of relevance for an occurrence of an event that satisfies the one or more conditions of the relevance detection rule.

2. The method of claim 1, wherein the alert relevance score associated with the second alert is an original alert relevance score assigned to the second alert.

3. The method of claim 1, wherein the alert relevance score associated with the second alert is a current alert relevance score assigned to the second alert.

4. The method of claim 1, wherein the alert relevance score provides a quantitative measure regarding a perceived degree of relevance of the alert.

5. The method of claim 1, wherein the current alert relevance score assigned to the first alert is determined as a weighted average of the original alert relevance score and the alert relevance score associated with the second alert.

6. The method of claim 1, wherein determining that the first alert is a duplicate of the second alert, comprises determining that the second alert was generated using the relevance detection rule for a second identity record associated with the first entity.

7. The method of claim 1, wherein determining that the first alert is a duplicate of the second alert, comprises determining that the second alert was generated using the relevance detection rule and same identities referenced by the first entity.

8. A non-transitory computer-readable storage medium containing a program, which, when executed by a processor performs an operation for processing identity records received by an entity resolution system, the operation comprising:
   receiving a first identity record;
   associating the first identity record with a first entity by one of resolving the first identity record to an existing entity in the entity resolution system and creating a new entity in the entity resolution system;
   evaluating at least the first entity against one or more conditions specified in a relevance detection rule;
   upon determining that the one or more conditions specified by the relevance detection rule are satisfied:
   generating a first alert, and
   assigning an original alert relevance score to the first alert, determined, at least in part, on a rule relevance score associated with the relevance detection rule; and
   upon determining that the first alert is a duplicate of a second, previously generated, alert, wherein the second alert was generated based on at least a second identity record associated with the first entity:
   retrieving at least an alert relevance score associated with the second alert, and
   assigning a current alert relevance score to the first alert, determined, at least in part, on the alert relevance score associated with the second alert and the original alert relevance score assigned to the first alert; wherein each of the alert relevance scores provides a quantitative measure of relevance for an occurrence of an event that satisfies the one or more conditions of the relevance detection rule.

9. The non-transitory computer-readable storage medium of claim 8, wherein the alert relevance score associated with the second alert is an original alert relevance score assigned to the second alert.

10. The non-transitory computer-readable storage medium of claim 8, wherein the alert relevance score associated with the second alert is a current alert relevance score assigned to the second alert.

11. The non-transitory computer-readable storage medium of claim 8, wherein the alert relevance score provides a quantitative measure regarding a perceived degree of relevance of the alert.

12. The non-transitory computer-readable storage medium of claim 8, wherein the current alert relevance score assigned to the first alert is determined as a weighted average of the original alert relevance score and the alert relevance score associated with the second alert.

13. The non-transitory computer-readable storage medium of claim 8, wherein determining that the first alert is a duplicate of the second alert, comprises determining that the second alert was generated using the relevance detection rule for a second identity record associated with the first entity.

14. The non-transitory computer-readable storage medium of claim 8, wherein determining that the first alert is a duplicate of the second alert, comprises determining that the second alert was generated using the relevance detection rule and same identities referenced by the first entity.

15. A system, comprising:
   a processor; and
   a memory containing a program, which, when executed by the processor is configured to process identity records received by an entity resolution system by performing a method comprising:
   receiving a first identity record;
   associating the first identity record with a first entity by one of resolving the first identity record to an existing entity in the entity resolution system and creating a new entity in the entity resolution system;
   evaluating at least the first entity against one or more conditions specified in a relevance detection rule;
   upon determining that the one or more conditions specified by the relevance detection rule are satisfied:
   generating a first alert, and assigning an original alert relevance score to the first alert, determined, at least in part, on a rule relevance score associated with the relevance detection rule; and upon determining that the first alert is a duplicate of a second, previously generated, alert:

retrieving at least an alert relevance score associated with the second alert, wherein the second alert was generated based on at least a second identity record associated with the first entity, and assigning a current alert relevance score to the first alert, determined, at least in part, on the alert relevance score associated with the second alert and the original alert relevance score assigned to the first alert; wherein each of the alert relevance scores provides a quantitative measure of relevance for an occurrence of an event that satisfies the one or more conditions of the relevance detection rule.

16. The system of claim 15, wherein the alert relevance score associated with the second alert is an original alert relevance score assigned to the second alert.

17. The system of claim 15, wherein the alert relevance score associated with the second alert is a current alert relevance score assigned to the second alert.

18. The system of claim 15, wherein the alert relevance score provides a quantitative measure regarding a perceived degree of relevance of the alert.

19. The system of claim 15, wherein the current alert relevance score assigned to the first alert is determined as a weighted average of the original alert relevance score and the alert relevance score associated with the second alert.

20. The system of claim 15, wherein determining that the first alert is a duplicate of the second alert, comprises determining that the second alert was generated using the relevance detection rule for a second identity record associated with the first entity.

21. The system of claim 15, wherein determining that the first alert is a duplicate of the second alert, comprises determining that the second alert was generated using the relevance detection rule and same identities referenced by the first entity.

* * * * *